(12) United States Patent
Yang et al.

(10) Patent No.: US 12,143,868 B2
(45) Date of Patent: Nov. 12, 2024

(54) SIDELINK TRANSMISSION IN MOBILE COMMUNICATION INVOLVING SWITCHING BETWEEN MULTIPLE V2X SIDELINK TECHNOLOGIES

(71) Applicant: LG ELECTRONICS INC., Seoul (KR)

(72) Inventors: Yoonoh Yang, Seoul (KR); Suhwan Lim, Seoul (KR); Jinyup Hwang, Seoul (KR); Sangwook Lee, Seoul (KR); Jongkeun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/716,659

(22) Filed: Apr. 8, 2022

(65) Prior Publication Data
US 2022/0232430 A1 Jul. 21, 2022

Related U.S. Application Data

(63) Continuation of application No. PCT/KR2021/002033, filed on Feb. 17, 2021.

(30) Foreign Application Priority Data

Feb. 19, 2020 (KR) .................. 10-2020-0020417
Apr. 2, 2020 (KR) .................. 10-2020-0040436

(51) Int. Cl.
*H04W 72/25* (2023.01)
*H04W 36/00* (2009.01)
(Continued)

(52) U.S. Cl.
CPC ... *H04W 36/0022* (2013.01); *H04W 72/0446* (2013.01); *H04W 72/1263* (2013.01);
(Continued)

(58) Field of Classification Search
CPC ......... H04W 28/0819; H04W 52/0203; H04W 36/00; H04W 72/25; H04W 72/40;
(Continued)

(56) References Cited

U.S. PATENT DOCUMENTS 5,737,695 A * 4/1998 Lagerqvist ............ G10L 19/012
331/110
2011/0051650 A1 * 3/2011 Winstok .................. H04W 4/08
370/312
(Continued)

FOREIGN PATENT DOCUMENTS

KR 10-1677768 B1 11/2016

OTHER PUBLICATIONS

R2-1815426, "PC5 Rat selection", Oct. 8-12, 2018, pp. 1-3 (Year: 2018).*
(Continued)

*Primary Examiner* — Salvador E Rivas
(74) *Attorney, Agent, or Firm* — BRYAN CAVE LEIGHTON PAISNER LLP

(57) ABSTRACT

A disclosure of the present specification provides a method for performing sidelink communication by a UE. The method may comprise the steps of: performing sidelink communication on the basis of a first RAT; switching an RAT for the sidelink communication from the first RAT to a second RAT; and performing the sidelink communication on the basis of the second RAT.

14 Claims, 21 Drawing Sheets

(51) Int. Cl.
*H04W 72/0446* (2023.01)
*H04W 72/1263* (2023.01)
*H04W 72/40* (2023.01)
*H04W 72/566* (2023.01)
*H04L 47/24* (2022.01)
*H04L 67/61* (2022.01)
*H04W 4/40* (2018.01)
*H04W 72/56* (2023.01)

(52) U.S. Cl.
CPC ........... *H04W 72/25* (2023.01); *H04W 72/40* (2023.01); *H04W 72/569* (2023.01); *H04L 47/24* (2013.01); *H04L 67/61* (2022.05); *H04W 4/40* (2018.02); *H04W 72/56* (2023.01)

(58) Field of Classification Search
CPC . H04W 40/36; H04W 52/40; H04W 28/0875; H04W 72/56; H04B 17/382; H04M 15/8038; H04L 47/24; H04L 67/61
See application file for complete search history.

(56) References Cited

U.S. PATENT DOCUMENTS

| | | | |
|---|---|---|---|
| 2018/0242234 A1* | 8/2018 | Semaan | H04W 48/18 |
| 2019/0132832 A1* | 5/2019 | Uchiyama | H04W 4/40 |
| 2019/0182880 A1* | 6/2019 | Yang | H04W 88/02 |
| 2019/0394625 A1* | 12/2019 | Kim | H04W 36/0022 |
| 2020/0178124 A1* | 6/2020 | Lei | H04W 28/24 |
| 2020/0359240 A1* | 11/2020 | Suzuki | H04W 24/08 |
| 2021/0092783 A1* | 3/2021 | Sun | H04W 76/15 |
| 2022/0053458 A1* | 2/2022 | Park | H04W 48/18 |
| 2022/0394735 A1* | 12/2022 | Lee | H04W 72/40 |
| 2022/0394754 A1* | 12/2022 | Ko | H04W 72/02 |

OTHER PUBLICATIONS

Kousaridas, Apostolos, "Multi-RAT, Multi-Link, Multioperator V2X Communications", Jun. 11-12, 2018, pp. 1-26 (Year: 2018).*
S.-Y. Lien et al., "3GPP NR Sidelink Transmissions Toward 5G V2X," in IEEE Access, vol. 8, pp. 35368-35382, 2020, doi: 10.1109/ACCESS.2020.2973706. (Year: 2020).*
R2-1903215, "Discussion on Inter-RAT Control", Apr. 8-Apr. 12, 2019, pp. 1-6 (Year: 2019).*
3GPP, "TS 38.133 v15.2.0", Jul. 2018, pp. 1-70 (Year: 2018).*
Oppo, "Discussion on Inter-RAT Control", R2-1903215, 3GPP TSG RAN WG2 Meeting #105bis, Xi'an, China, Mar. 29, 2019, See Sections 2, 2.1-2.3.
Nokia, "Remaining Physical Layer Aspects of Dual Active Protocol Stack Based HO", R1-2001051, 3GPP TSG RAN WG1 Meeting #100e, Feb. 14, 2020, See Section 2.3.
Samsung, "TX Profile for Selected Sidelink Rat", R2-1915941, 3GPP TSG RAN WG2 Meeting #108, Reno, USA, Nov. 8, 2019, See Section 2.
Ericsson, "Remaining Issues on Capability Transfer in Sidelink", R2-1915382, 3GPP TSG RAN WG2 Meeting #108, Reno, USA, Nov. 7, 2019, See Section 2.
U.S. Appl. No. 17/716,659, filed Apr. 8, 2022, Yoonah Yang et al.
International Search Report from PCT/KR2021/002033, dated Apr. 23, 2021.
Written Opinion of the ISA from PCT/KR2021/002033, dated Apr. 23, 2021.

* cited by examiner

FIG. 10

SIDELINK TRANSMISSION IN MOBILE COMMUNICATION INVOLVING SWITCHING BETWEEN MULTIPLE V2X SIDELINK TECHNOLOGIES

This application is the Continuation Bypass of International Application No. PCT/KR2021/002033, filed on Feb. 17, 2021, which claims the benefit of Korean Application No. 10-2020-0020417, filed on Feb. 19, 2020, and Korean Application No. 10-2020-0040436, filed on Apr. 2, 2020 the contents of which are all hereby incorporated by reference herein in their entirety.

BACKGROUND OF THE DISCLOSURE

Field of the Disclosure

The present disclosure generally relates to mobile communication.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Sidelink (SL) refers to a communication method in which a direct link is established between user equipments (UEs) and audio or data is directly exchanged by the UEs without a base station (BS). SL is considered as a method for solving the burden of a base station due to rapidly increasing data traffic.

V2X (vehicle-to-everything) refers to communication technology of exchanging information with other vehicles, pedestrians, and objects having infrastructure through wired/wireless communication. V2X can be classified into four types: vehicle-to-vehicle (V2V), vehicle-to-infrastructure (V2I), vehicle-to-network (V2N), and vehicle-to-pedestrian (V2P). V2X communication can be provided through a PC5 interface and/or a Uu interface.

Meanwhile, a method for a UE supporting both LTE V2X (or SL) communication and NR V2X (or SL) communication to efficiently perform V2X (or SL) communication has not been discussed.

SUMMARY

Accordingly, a disclosure of the present specification has been made in an effort to solve the aforementioned problem.

To solve the aforementioned problems, a disclosure of the present specification provides a method of performing sidelink communication by user equipment (UE). The method may include performing sidelink communication based on a first radio access technology (RAT), switching a RAT for the sidelink communication from the first RAT to a second RAT, and performing the sidelink communication based on the second RAT.

To solve the aforementioned problems, a disclosure of the present specification provides user equipment (UE) performing sidelink communication. The UE includes at least one processor and at least one memory configured to store instructions and be operably electrically connectable to the at least one processor, wherein operations performed based on the instructions being executed by the at least one processor may include performing sidelink communication based on a first radio access technology (RAT), switching a RAT for the sidelink communication from the first RAT to a second RAT, and performing the sidelink communication based on the second RAT.

To solve the aforementioned problems, a disclosure of the present specification provides an apparatus in mobile communication. The apparatus includes at least one processor and at least one memory configured to store instructions and be operably electrically connectable to the at least one processor, wherein operations performed based on the instructions being executed by the at least one processor may include generating a signal for sidelink communication based on a first radio access technology (RAT), switching a RAT for the sidelink communication from the first RAT to a second RAT, and generating a signal for the sidelink communication based on the second RAT.

To solve the aforementioned problems, a disclosure of the present specification provides a non-transitory computer-readable storage medium that records instructions. The instructions, when executed by one or more processors, may cause the one or more processors to generate a signal for sidelink communication based on a first radio access technology (RAT), to switch a RAT for the sidelink communication from the first RAT to a second RAT, and to generate a signal for the sidelink communication based on the second RAT.

ADVANTAGEOUS EFFECTS

According to the disclosure of the present specification, it is possible to solve the problems of the prior art.

Effects that can be obtained through specific examples of the present specification are not limited to the effects listed above. For example, various technical effects that a person having ordinary skill in the related art can understand or derive from the present specification may exist. Accordingly, the specific effects of the present specification are not limited to those explicitly described herein, and may include various effects that can be understood or derived from the technical characteristics of the present specification.

BRIEF DESCRIPTION OF THE DRAWINGS

FIG. 10 shows an example of a symbol configuration of an NR V2X physical channel according to a first example of the present disclosure.

DESCRIPTION OF EXEMPLARY EMBODIMENTS

Figure 1:
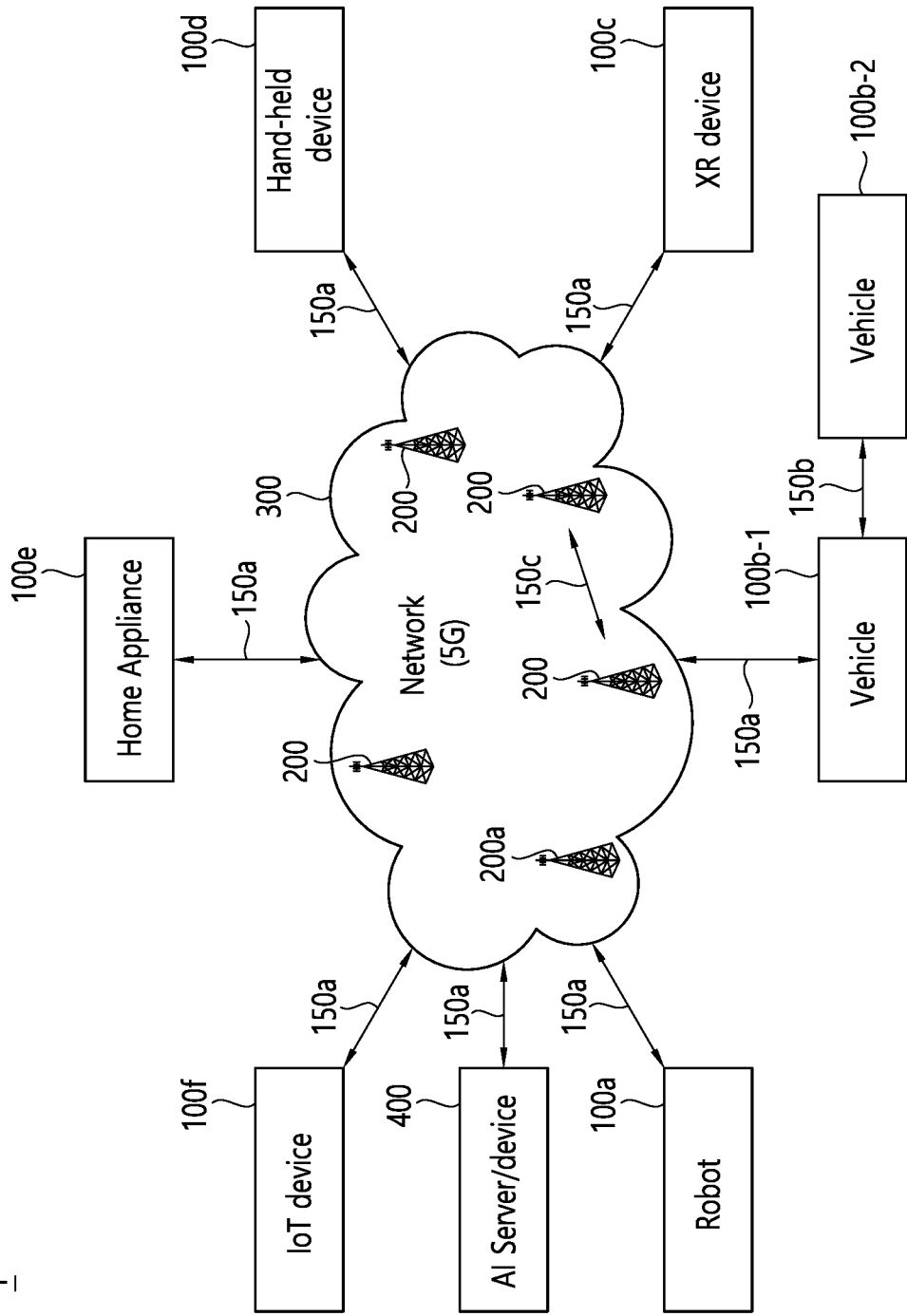
FIG. 1 shows an example of a communication system to which implementation of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. Evolution of 3GPP LTE includes LTE-A (advanced), LTE-A Pro, and/or 5G NR (new radio).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

Although a user equipment (UE) is illustrated by way of example in the accompanying drawings, the illustrated UE may be referred to as a terminal, mobile equipment (ME), and the like. In addition, the UE may be a portable device such as a notebook computer, a mobile phone, a PDA, a smartphone, and a multimedia device or may be a non-portable device such as a PC or a vehicle-mounted device.

Hereinafter, a UE is used as an example of a wireless communication device (or a wireless device or wireless equipment) capable of wireless communication. An operation performed by a UE may be performed by a wireless communication device. A wireless communication device may also be referred to as a wireless device, wireless equipment, or the like. Hereinafter, AMF may mean an AMF node, SMF may mean an SMF node, and UPF may mean a UPF node.

A base station used below generally refers to a fixed station communicating with a wireless device and may also be referred as an evolved-NodeB (eNodeB), an evolved-NodeB (eNB), a base transceiver system (BTS), an access point, and a next generation NodeB (gNB).

I. Techniques and Procedures Applicable to Present Disclosure

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
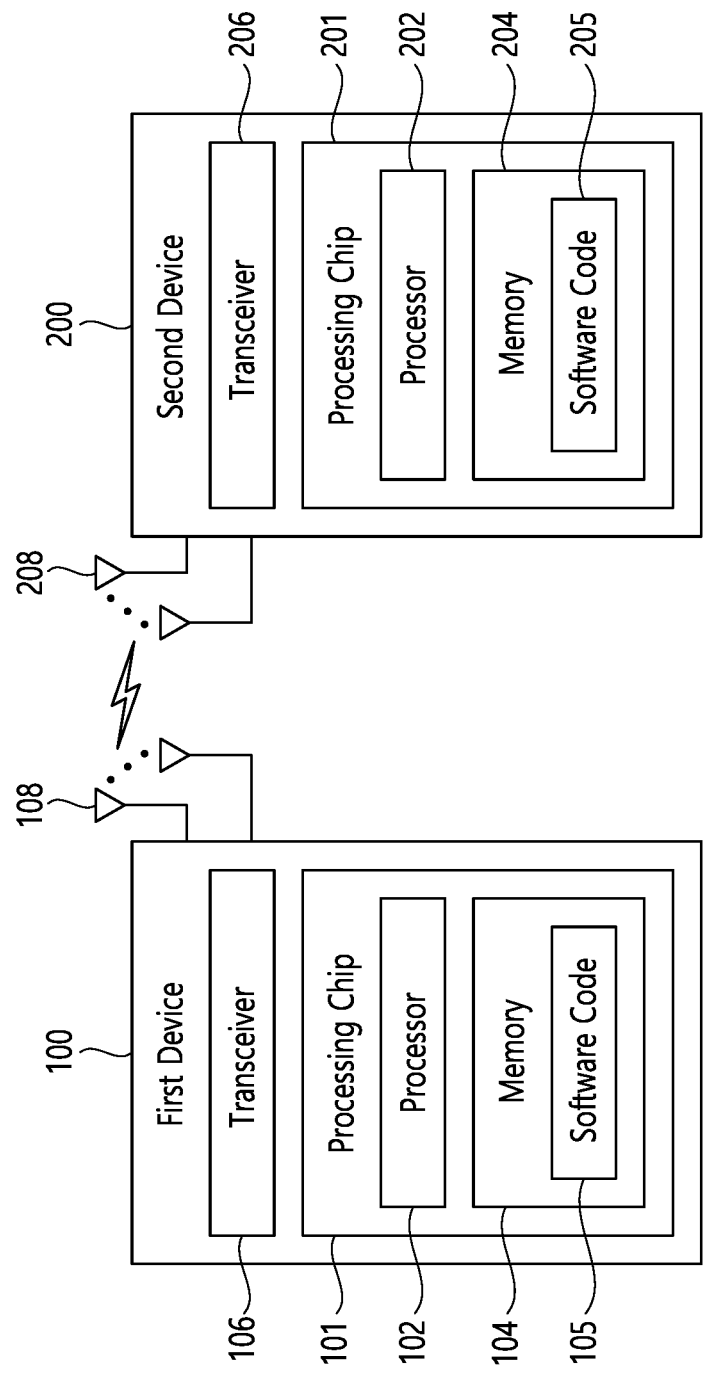
FIG. 2 shows an example of a wireless device to which implementation of the present disclosure is applied.

FIG. 2 Shows an Example of Wireless Devices to which Implementations of the Present Disclosure is Applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
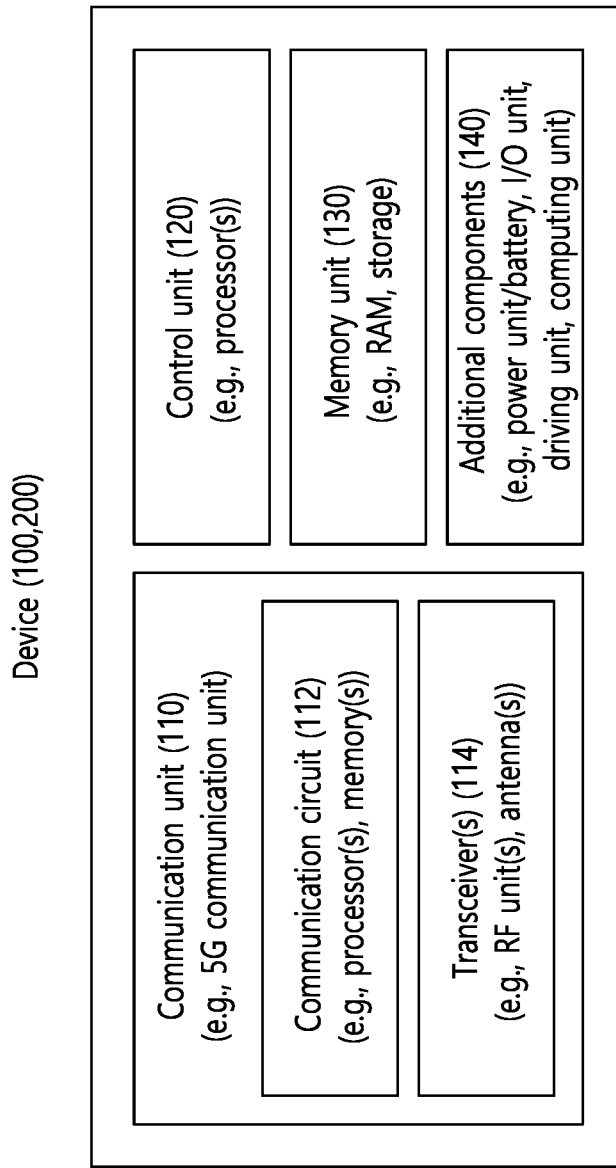
FIG. 3 shows an example of a wireless device to which implementation of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a DRAM, a ROM, a flash memory, a volatile memory, a non-volatile memory, and/or a combination thereof.

Figure 4:
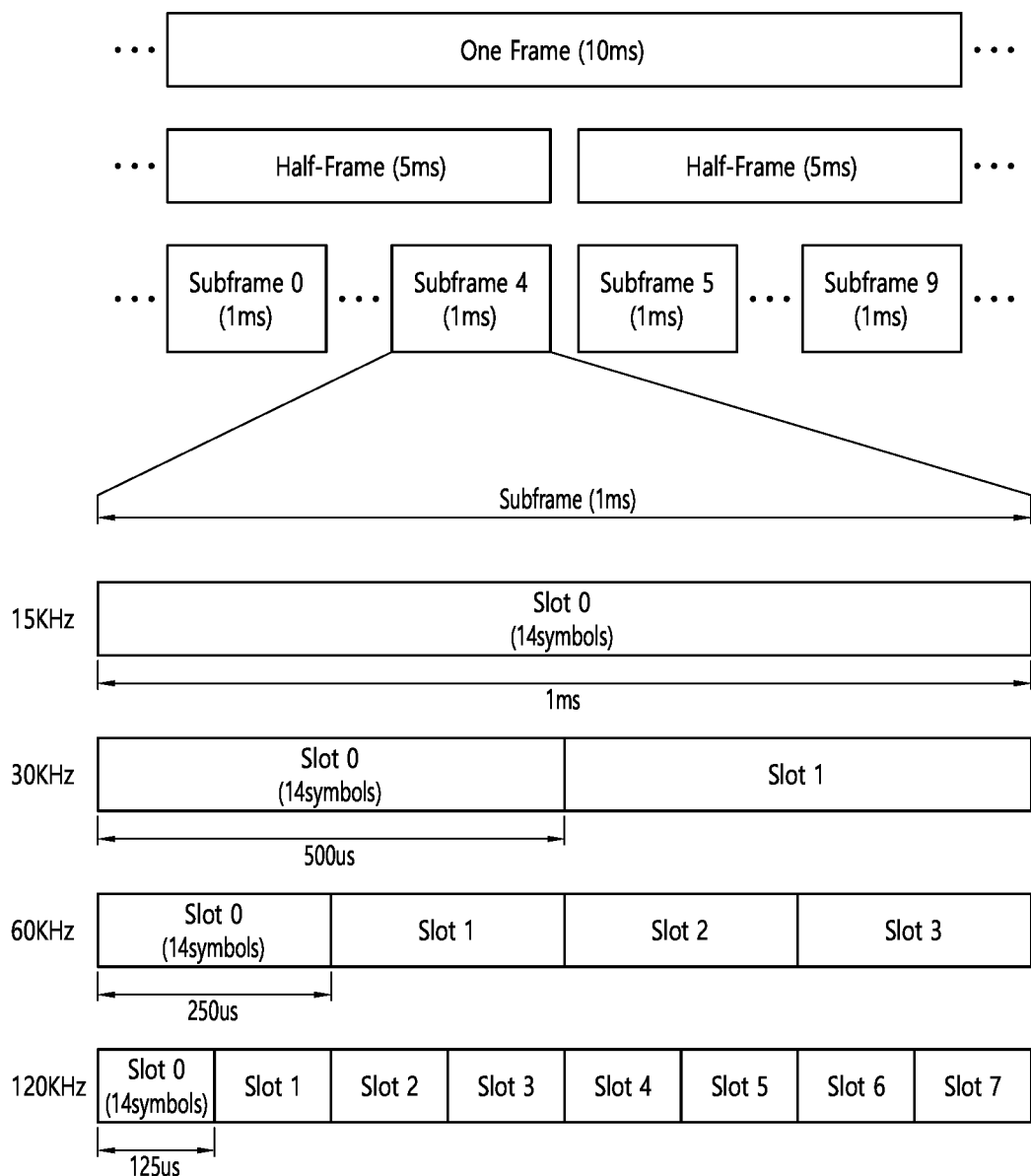
FIG. 4 shows an example of a radio frame structure of NR to which implementation of the present disclosure is applied.

FIG. 4 Shows an Example of a Radio Frame Structure of NR to which Implementation of the Present Disclosure is Applied.

Figure 5:
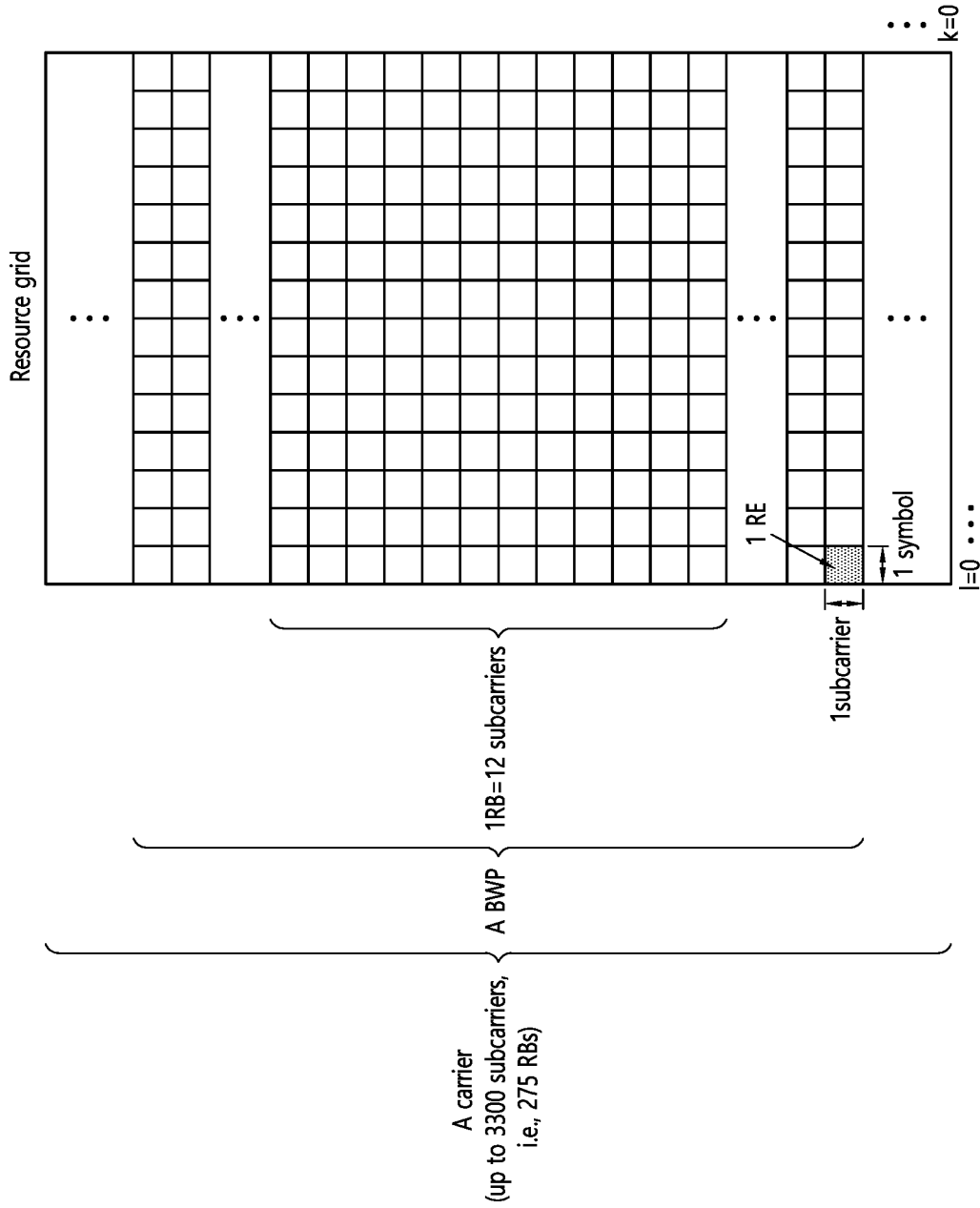
FIG. 5 shows an example of a slot structure of an NR frame to which implementation of the present disclosure is applied.

FIG. 5 shows a radio frame structure of NR according to an embodiment of the present disclosure. The embodiment of FIG. 5 may be combined with various embodiments of the present disclosure.

Referring to FIG. 5, a radio frame may be used in uplink and downlink transmission in NR. The radio frame has a length of 10 ms and may be defined as two 5 ms half-frames (HF). A half-frame may include 5 1 ms subframes (SF). A subframe may be divided into one or more slots, and the number of slots in a subframe may be determined according to a subcarrier spacing (SCS). Each slot may include 12 or 14 OFDM(A) symbols according to a cyclic prefix (CP).

When a normal CP is used, each slot may include 14 symbols. When an extended CP is used, each slot may include 12 symbols. Here, the symbol may include an OFDM symbol (or a CP-OFDM symbol), a single carrier-FDMA (SC-FDMA) symbol (or a discrete Fourier transform-spread-OFDM (DFT-s-OFDM) symbol).

FIG. 5 shows an example of a slot structure of an NR frame to which implementation of the present disclosure is applied.

FIG. 6 shows a slot structure of an NR frame according to an embodiment of the present disclosure. The embodiment of FIG. 6 may be combined with various embodiments of the present disclosure.

Referring to FIG. 6, a slot includes a plurality of symbols in the time domain. For example, one slot may include 14 symbols in the case of the normal CP, whereas one slot may include 12 symbols in the case of an extended CP. Alternatively, one slot may include 7 symbols in the case of a normal CP, whereas one slot may include 6 symbols in the case of an extended CP.

A carrier includes a plurality of subcarriers in the frequency domain. A resource block (RB) may be defined as a plurality of (e.g., 12) consecutive subcarriers in the frequency domain A bandwidth part (BWP) may be defined as a plurality of consecutive (physical) resource blocks ((P)RB) in the frequency domain and may correspond to one numerology (e.g., SCS, CP length, etc.). A carrier may include a maximum of N (e.g., 5) BWPs. Data communication may be performed through an activated BWP. Each element may be referred to as a resource element (RE) in a resource grid, and one complex symbol may be mapped thereto.

A radio interface between UEs or a radio interface between a UE and a network may be configured as an L1 layer, an L2 layer, and an L3 layer. In various embodiments of the present disclosure, the L1 layer may mean a physical layer. For example, the L2 layer may mean at least one of a MAC layer, an RLC layer, a PDCP layer, and an SDAP layer. For example, the L3 layer may mean an RRC layer.

Hereinafter, V2X or SL communication will be described.

Figure 6A:
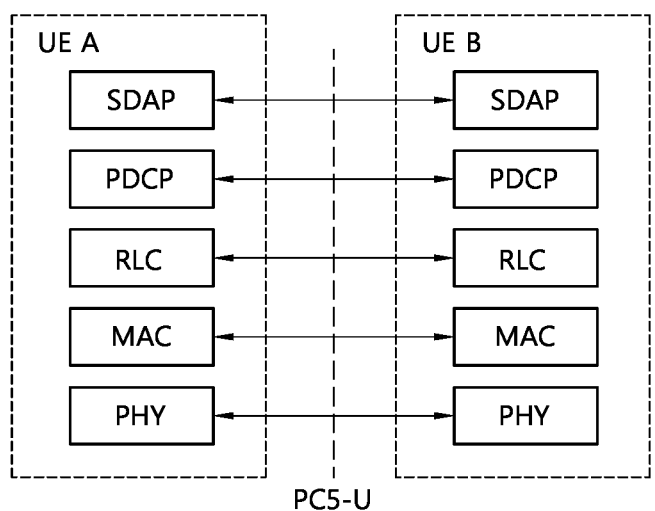
FIG. 6a and FIG. 6b show an example of a radio protocol architecture for SL communication to which implementation of the present disclosure is applied.
Figure 6B:
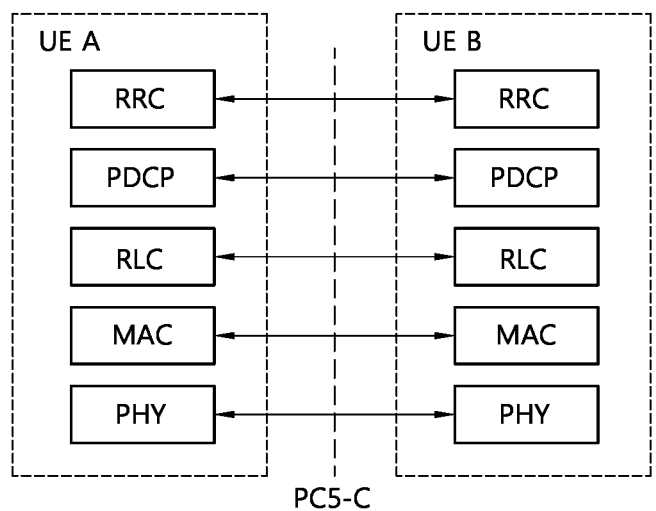

FIG. 6a and FIG. 6b show an example of a radio protocol architecture for SL communication to which implementation of the present disclosure is applied.

FIG. 6a and FIG. 6b show a radio protocol architecture for SL communication according to an embodiment of the present disclosure. The embodiment of FIG. 6a and FIG. 6b may be combined with various embodiments of the present disclosure. Specifically, FIG. 6a shows a user plane protocol stack and FIG. 6b shows a control plane protocol stack.

Hereinafter, a sidelink synchronization signal (SLSS) and synchronization information will be described.

The SLSS is an SL-specific sequence and may include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS). For example, length-127 M-sequences may be used for the S-PSS and length-127 Gold sequences may be used for the S-SSS. For example, a UE may detect an initial signal using the S-PSS and may obtain synchronization. For example, the UE may acquire detailed synchronization using the S-PSS and the S-SSS and may detect a synchronization signal ID.

A physical sidelink broadcast channel (PSBCH) may be a (broadcast) channel through which basic (system) information that a UE needs to know first before transmission and reception of an SL signal is transmitted. For example, the basic information may be SLSS-related information, a duplex mode (DM), a time division duplex uplink/downlink (TDD UL/DL) configuration, resource pool related information, the type of an application related to SLSS, a subframe offset, broadcast information, and the like. For example, for evaluation of PSBCH performance, a payload size of the PSBCH may be 56 bits including a 24-bit CRC in NR V2X.

The S-PSS, S-SSS, and PSBCH may be included in a block format supporting periodic transmission (e.g., SL synchronization signal (SS)/PSBCH block, which may be included in a sidelink-synchronization signal block (S-SSB)). The S-SSB may have the same numerology (i.e., SCS and CP length) as a physical sidelink control channel (PSCCH)/physical sidelink shared channel (PSSCH) in a carrier, and a transmission bandwidth may be within a (pre)set sidelink BWP (SL BWP). For example, the bandwidth of the S-SSB may be 11 resource blocks (RBs). For example, the PSBCH may span 11 RBs. In addition, the frequency position of the S-SSB may be set (in advance). Therefore, the UE does not need to perform hypothesis detection in the frequency domain in order to discover the S-SSB in a carrier.

Figure 7:
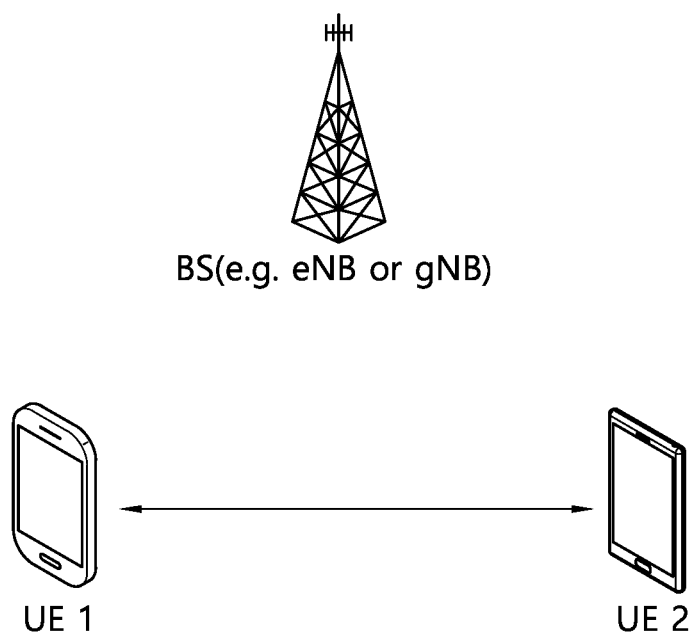
FIG. 7 shows an example of a UE performing V2X or SL communication to which implementation of the present disclosure is applied.

FIG. 7 shows an example of a UE performing V2X or SL communication to which implementation of the disclosure is applied.

FIG. 7 shows a UE performing V2X or SL communication according to an embodiment of the present disclosure. The embodiment of FIG. 7 may be combined with various embodiments of the present disclosure.

Referring to FIG. 7, the term "UE" in V2X or SL communication may refer to a user's terminal. However, when network equipment such as a base station transmits and receives signals according to a communication method between UEs, the base station may also be regarded as a kind of UE. For example, UE 1 may be a first device 100 and UE 2 may be a second device 200.

For example, UE 1 may select a resource unit corresponding to a specific resource from a resource pool indicating a set of a series of resources. UE 1 may transmit an SL signal using the resource unit. For example, a resource pool in which UE 1 can transmit signals may be configured for UE 2, which is a receiving UE, and UE 2 may detect a signal of UE 1 in the resource pool.

Here, when UE 1 is within the coverage of a base station, the base station may inform UE 1 of the resource pool. On the other hand, when UE 1 is outside the coverage of the base station, another UE may inform UE 1 of the resource pool, or UE 1 may use a preset resource pool.

In general, a resource pool may be composed of a plurality of resource units, and each UE may select one or a plurality of resource units and use the same for SL signal transmission thereof.

Hereinafter, resource allocation in SL will be described.

Figure 8A:
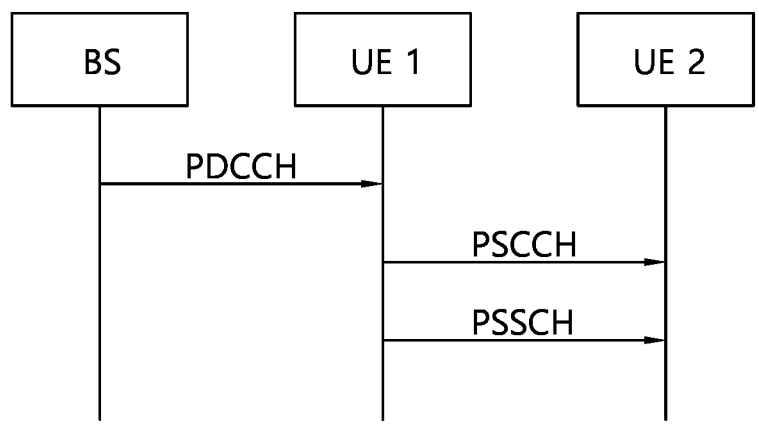
FIG. 8a and FIG. 8b show an example of a procedure in which a UE to which implementation of the present disclosure is applied performs V2X or SL communication according to a transmission mode.
Figure 8B:
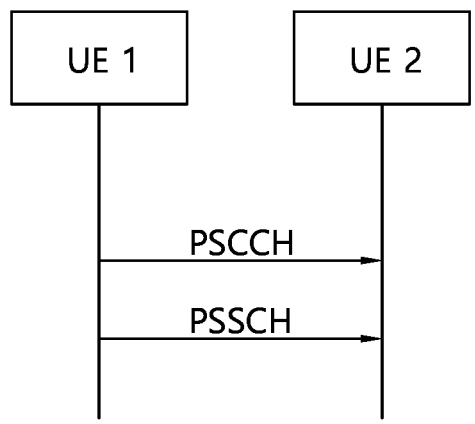

FIG. 8a and FIG. 8b show an example of a procedure in which a UE to which implementation of the present disclosure is applied performs V2X or SL communication according to a transmission mode.

FIG. 8a and FIG. 8b show a procedure in which a UE performs V2X or SL communication according to a transmission mode according to an embodiment of the present disclosure. The embodiment of FIGS. 8a and 8b may be combined with various embodiments of the present disclosure. In various embodiments of the present disclosure, a transmission mode may be referred to as a mode or a resource allocation mode. Hereinafter, for convenience of description, a transmission mode in LTE may be referred to as an LTE transmission mode, and a transmission mode in NR may be referred to as an NR resource allocation mode.

For example, FIG. 8a shows a UE operation related to LTE transmission mode 1 or LTE transmission mode 3. Alternatively, FIG. 8a shows a UE operation related to NR resource allocation mode 1, for example. For example, LTE transmission mode 1 may be applied to general SL communication, and LTE transmission mode 3 may be applied to V2X communication.

For example, FIG. 8b shows a UE operation related to LTE transmission mode 2 or LTE transmission mode 4. Alternatively, FIG. 8b shows a UE operation related to NR resource allocation mode 2, for example.

Referring to FIG. 8a, in LTE transmission mode 1, LTE transmission mode 3, or NR resource allocation mode 1, a base station may schedule an SL resource to be used by a UE for SL transmission. For example, the base station may perform resource scheduling for UE 1 through a PDCCH (more specifically, downlink control information (DCI)), and UE 1 may perform V2X or SL communication with UE 2 according to resource scheduling. For example, UE 1 may transmit sidelink control information to UE 2 through a physical sidelink control channel (PSCCH), and then transmit data based on the sidelink control information to UE 2 through a physical sidelink shared channel (PSSCH).

Referring to FIG. 8b, in LTE transmission mode 2, LTE transmission mode 4, or NR resource allocation mode 2, a UE may determine an SL transmission resource within SL resources configured by a base station/network or preset SL resources. For example, the configured SL resources or the preset SL resources may be a resource pool. For example, the UE may autonomously select or schedule a resource for SL transmission. For example, the UE may perform SL communication by selecting a resource by itself within the configured resource pool. For example, the UE may select a resource by itself within a selection window by performing a sensing and resource (re)selection procedure. For example, sensing may be performed in units of subchannels. In addition, UE 1, which has selected a resource within the resource pool, may transmit sidelink control information to UE 2 through a PSCCH, and then transmit data based on the sidelink control information to UE 2 through a PSSCH.

For reference, Table 3 below shows an example of operating bands used for V2X (or SL) communication.

TABLE 3

| Operating Band | V2X Operating Band | V2X UE transmit $F_{UL\_low}$ – $F_{UL\_high}$ | V2X UE receive $F_{DL\_low}$ – $F_{DL\_high}$ | Duplex Mode | Interface |
|---|---|---|---|---|---|
| 47 | 47 | 5855 MHz–5925 MHz | 5855 MHz–5925 MHz | Half duplex (HD) | PC5 |

When operating band 47 according to the example of Table 3 is used for E-UTRA V2X (or SL) communication, operating band 47 may be referred to as B47. When operating band 47 according to the example of Table 3 is used for NR V2X (or SL) communication, operating band 47 may be referred to as n47.

For reference, at least one method proposed according to various embodiments of the present disclosure may be applied to not only sidelink communication or V2X based on a PC5 interface or an SL interface (e.g., PSCCH, PSSCH, PSBCH, PSSS/SSSS, etc.) but also sidelink communication or V2X communication based on a Uu interface (e.g., PUSCH, PDSCH, PDCCH, PUCCH, etc.).

In various embodiments of the present disclosure, a reception operation of a UE may include an operation of decoding and/or receiving a sidelink channel and/or a sidelink signal (e.g., PSCCH, PSSCH, PSFCH, PSBCH, PSSS/SSSS, etc.). In various embodiments of the present disclosure, a transmission operation of a UE may include an operation of transmitting a sidelink channel and/or a sidelink signal (e.g., PSCCH, PSSCH, PSFCH, PSBCH, PSSS/SSSS, etc.).

Meanwhile, in various embodiments of the present disclosure, for example, a (physical) channel used when an RX UE transmits at least one piece of the following information to a TX UE may be referred to as a PSFCH for convenience of description.

SL HARQ feedback, SL CSI, SL (L1) RSRP

In various embodiments of the present disclosure, a Uu channel may include a UL channel and/or a DL channel. For example, the UL channel may include a PUSCH, a PUCCH, and the like. For example, the DL channel may include a PDCCH, a PDSCH, and the like. For example, the SL channel may include a PSCCH, a PSSCH, a PSFCH, a PSBCH, and the like.

II. Disclosure of the Present Specification

The disclosures described below in this specification may be implemented in one or more combinations (e.g., combinations including at least one of contents described below). Each of the drawings shows an embodiment of each disclosure, but embodiments of the drawings may be implemented in combination.

A method proposed in the present disclosure may composed of a combination of one or more operations/configurations/steps described below. The following methods described below may be performed or used in combination or complementarily.

The present disclosure describes a method by which a UE can perform efficient V2X communication. For example, for NR V2X communication and LTE V2X communication in the same frequency band, the UE may be implemented to use a common RF power amplifier (PA). This UE may support NR V2X communication and LTE V2X communication in the same frequency band through time division multiplexing (TDM). With respect to RF switching time in this case, a method for a UE to perform efficient V2X communication will be described.

For reference, in the disclosure of the present specification, sidelink (SL), V2X, and V2X sidelink (SL) may be used as the same meaning.

In other words, the present disclosure proposes an efficient V2X operation of a UE with respect to RF switching time when a UE implemented as a common radio frequency (RF) power amplifier (PA) supports NR V2X and LTE V2X of the same frequency band in a time division multiplexing method.

LTE V2X and NR V2X are currently defined in the 5.9 GHz band. For example, a UE may perform LTE V2X communication and/or NR V2X communication based on the 5.9 GHz band. The UE may support LTE V2X communication and NR V2X communication by using the same RF. For example, there may be a UE capable of supporting both LTE V2X and NR V2X or a UE capable of supporting only one of NR V2X and LTE V2X. Therefore, capability signaling for distinguishing a UE capable of supporting both LTE V2X and NR V2X may be required. For example, capability signaling capable of distinguishing a UE may be required such that a network can support a UE capable of supporting both LTE V2X and NR V2X and only one of NR V2X and LTE V2X.

In the present disclosure, capability signaling with respect to a UE capable of supporting LTE V2X communication and NR V2X communication in a TDM manner is newly defined using the same RF.

Hereinafter, an example of capability signaling according to an embodiment of the present disclosure will be described with reference to FIG. 9.

The following drawings were created to explain a specific example of the present disclosure. Since the names of specific devices described in the drawings or the names of specific signals/messages/fields are presented by way of example, the technical features of the present disclosure are not limited to the specific names used in the following drawings.

Figure 9:
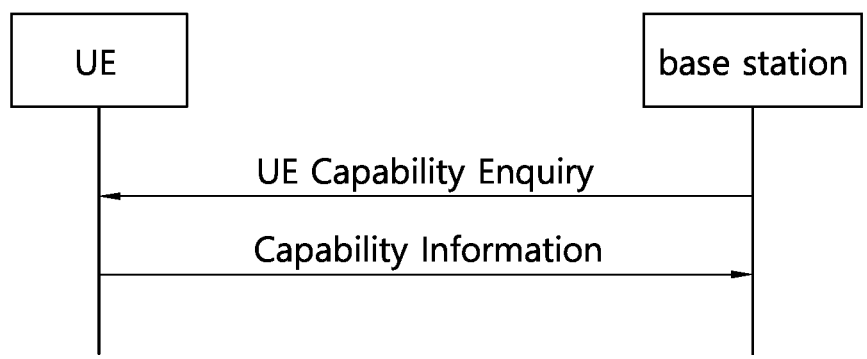
FIG. 9 shows an example of capability signaling according to the present disclosure.

FIG. 9 Shows an Example of Capability Signaling According to the Present Disclosure.

Referring to FIG. 9, an example of capability signaling according to the present disclosure is shown. Capability signaling shown in FIG. 9 is merely an example, and the scope of the present disclosure may include any signaling by which a UE informs a base station whether the UE can support both LTE V2X and NR V2X.

A base station (e.g., gNB, eNB, or the like) may transmit a UE capability inquiry message to a terminal (e.g., UE). The UE capability inquiry message transmitted by the base station may be a message for inquiring whether the UE can support both LTE V2X and NR V2X.

The UE may transmit capability information to the base station. The capability information may include information on whether the UE can support both LTE V2X and NR V2X. For example, the capability information may include information on whether the UE can support both LTE V2X communication and NR V2X communication using the same RF. When the UE capability inquiry message is received, the UE may transmit the capability information to the base station. Alternatively, the step in which the base station transmits the UE capability inquiry message may be omitted, and the UE may transmit the capability information to the base station even if the UE capability inquiry message is not received.

Hereinafter, an efficient V2X operation of a UE supporting LTE V2X and NR V2X in a TDM manner is proposed based on RF switching time and physical channels (PSSCH, PSCCH, PSFCH, PSPSS/PSSSS/PSBCH) described in the NR V2X standard. Here, the RF switching time may mean a switching time required when the UE switches communication from LTE V2X to NR V2X or from NR V2X to LTE V2X.

In the case of NR V2X, a subcarrier spacing (SCS) is defined as 15 kHz, 30 kHz and 60 kHz in FR1 (Frequency Range 1: 410 MHz to 7125 MHz), and 60 kHz and 120 kHz in FR2 (Frequency Range 2: 24250 MHz to 52600 MHz).

On the other hand, in the case of LTE V2X, only one SCS is defined. In LTE V2X, only a single SCS 15 kHz is defined.

In the present disclosure, communication in FR1 sharing a frequency with LTE V2X will be described first.

The RF switching time may be defined in consideration of an RF retuning time (local oscillator (LO) frequency retuning time+RF chain reconfiguration time) and a transient period defined in the 3rd Generation Partnership Project (3GPP) standard. Here, the LO frequency retuning time may mean a time required to switch from the LTE V2X carrier frequency to the NR V2X carrier frequency, or a time required to switch from the NR V2X carrier frequency to the LTE V2X carrier frequency. The RF chain reconfiguration time may mean a time required to switch an RF chain configuration from LTE V2X to NR V2X or from NR V2X to LTE V2X. The transient period may mean a time required to switch LTE V2X RF from ON to OFF and to switch NR V2X RF from OFF to ON during switching from LTE V2X to NR V2X, or a time required to switch NR V2X RF from ON to OFF and to switch LTE V2X RF from OFF to ON during switching from NR V2X to LTE V2X. For example, in the present disclosure, the RF switching time may be defined as follows.

RF Switching time=LTE *V2X* transient period+RF retuning time+NR *V2X* transient period Here, the LTE V2X transient period may be 20 μs. The NR V2X transient period may be 10 μs. RF retuning time may be 120 μs to 210 μs in FR1.

Hereinafter, the present disclosure will be described in more detail with reference to a first example and a second example of the present disclosure.

1. First Example of Present Disclosure

RF switching may occur between an LTE V2X sub-frame and an NR V2X slot. A UE may transmit security-related information, safety-related information, and data through LTE V2X communication. In addition, the UE may transmit data through NR V2X communication. Since the UE transmits security-related information and safety-related information through LTE V2X communication, LTE V2X communication (e.g., transmission) may be more important than NR V2X communication.

The first example of the present disclosure proposes that, RF retuning is basically performed in the NR V2X slot on the assumption that LTE V2X communication (e.g., transmission) is more important than NR V2X communication.

That is, the first example of the present disclosure proposes that a UE supporting both LTE V2X and NR V2X using the same RF performs RF retuning in the NR V2X slot when the UE switches communication between LTE V2X and NR V2X in a TDM manner.

Hereinafter, the first example of the present disclosure will be described in detail with reference to the examples of FIGS. 10 to 15.

The following drawings were created to explain a specific example of the present disclosure. Since the names of specific devices described in the drawings or the names of specific signals/messages/fields are presented by way of example, the technical features of the present disclosure are not limited to the specific names used in the following drawings.

Figure 10:
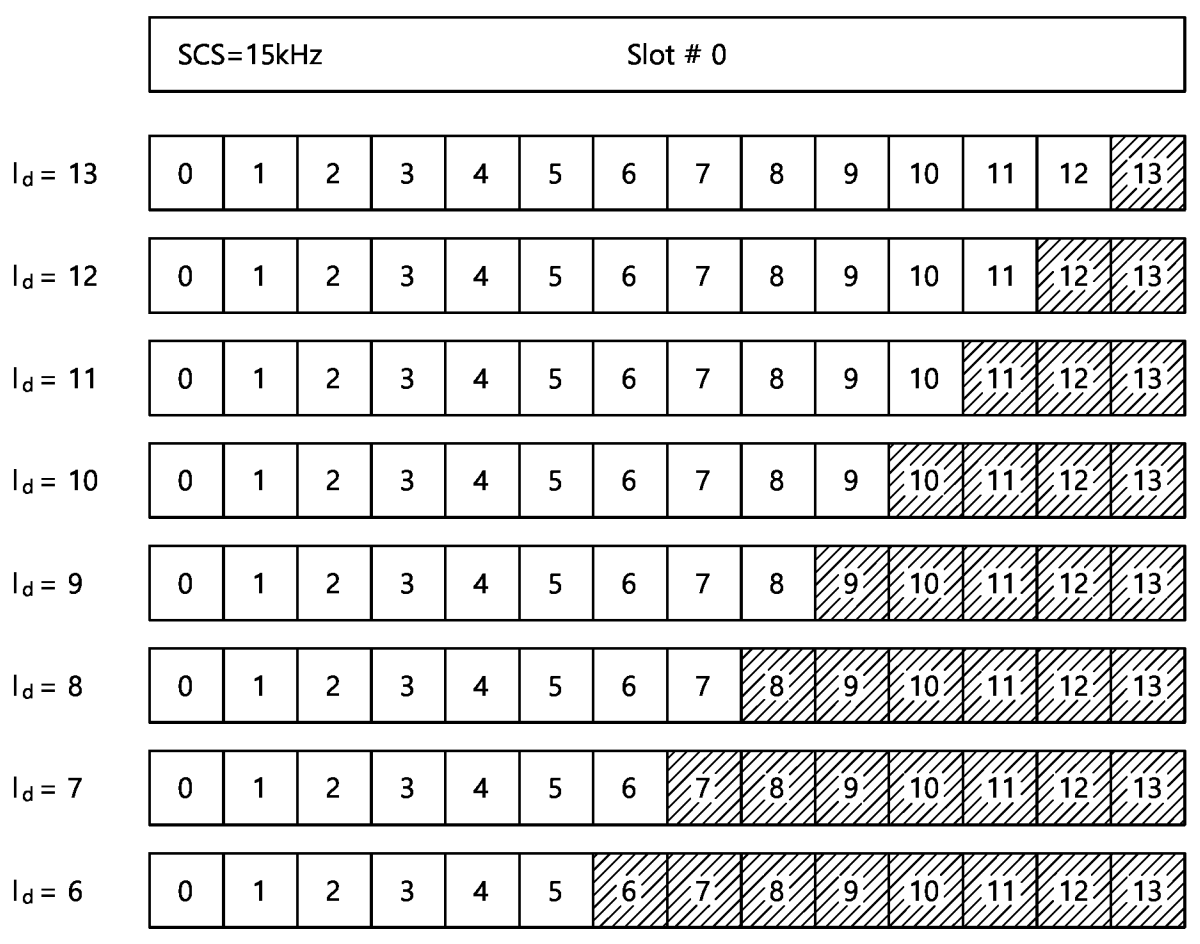

FIG. 10 shows an example of a symbol configuration of an NR V2X physical channel according to a first example of the present disclosure.

FIG. 10 shows an example of a symbol configuration of an NR V2X physical channel (e.g., PSSCH and PSCCH). FIG. 10 shows an example of a symbol configuration when the SCS is 15 kHz and the normal cyclic prefix (CP) is used.

Referring to FIG. 10, the NR V2X physical channel (PSSCH & PSCCH) may be configured such that the number of symbols configured (or allocated) in one slot is 6 to 13 (e.g., $l_d$=6, 7, 8, 9, 10, 11, 12, 13) in the case of the normal CP. Here, $l_d$ may represent the number of data symbols (e.g., data symbols constituting a PSSCH) included in one slot. For example, $l_d$ may represent a duration of a resource scheduled for PSSCH transmission.

For example, when $l_d$=6, a total of 6 symbols from symbol 0 to symbol 5 in a slot may be configured. When $l_d$=13, a total of 13 symbols may be configured from symbol 0 to symbol 12.

The first symbol (e.g., symbol 0) may be used for AGC. Therefore, the number of symbols used for transmission or reception of actual data may be 5 to 12. This is because the first symbol among 6 to 13 symbols configured (or allocated) in one slot cannot be used for data transmission or reception.

In addition, 1 to 8 gap symbols may be configured (or set) from the rear part of a slot (e.g., from a part having a large symbol number in the slot). For example, when $l_d$=6, a total of 8 symbols from symbol 13 to symbol 6 in a slot may be configured as gap symbols. When $l_d$=13, symbol 13, a total of one symbol may be configured as a gap symbol.

The following drawings were created to explain a specific example of the present disclosure. Since the names of specific devices described in the drawings or the names of specific signals/messages/fields are presented by way of example, the technical features of the present disclosure are not limited to the specific names used in the following drawings.

Figure 11:
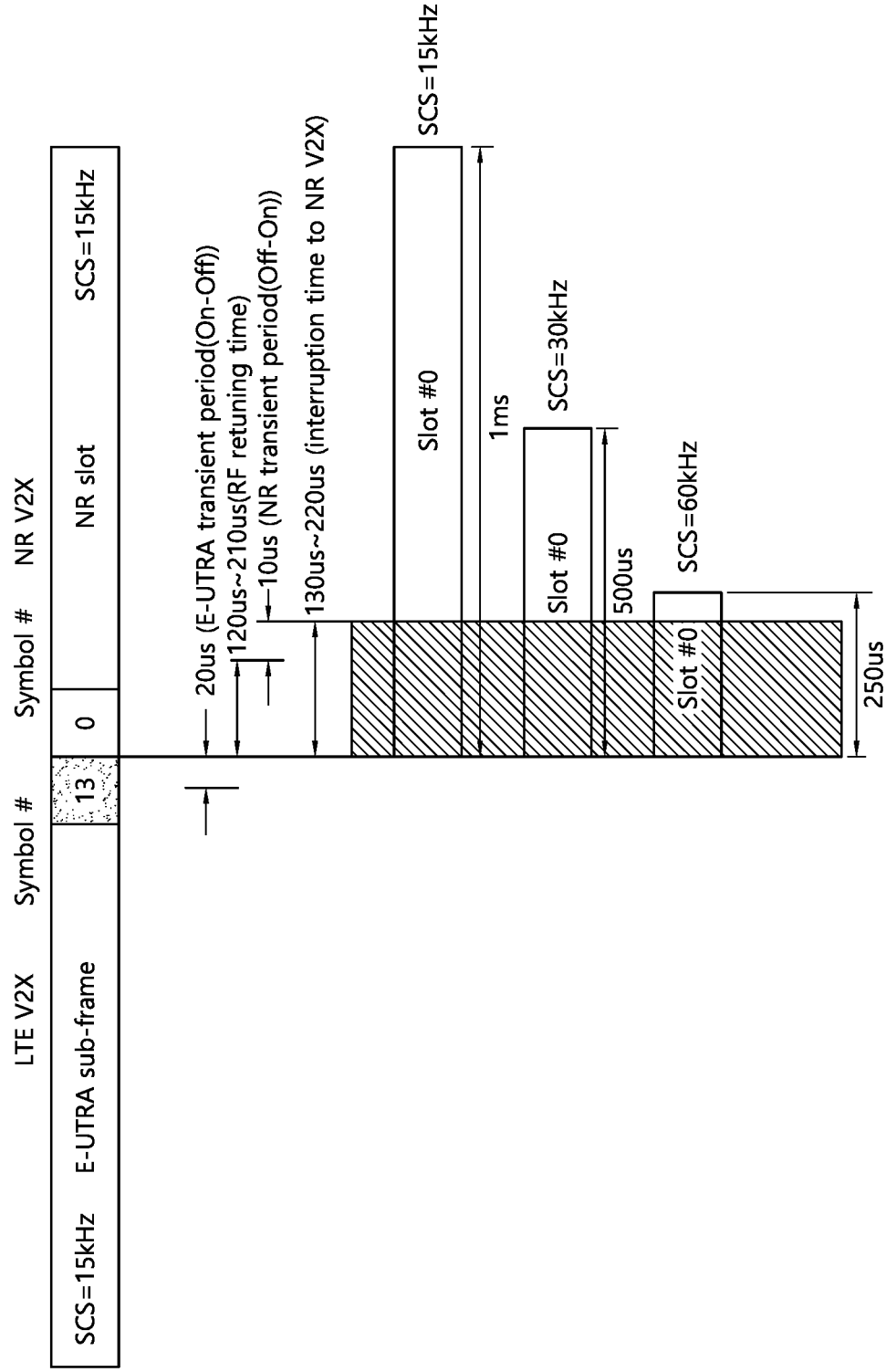
FIG. 11 shows an example of RF switching time during switching from LTE V2X to NR V2X according to the first example of the present disclosure.

FIG. 11 shows an example of RF switching time during switching from LTE V2X to NR V2X according to the first example of the present disclosure.

FIG. 11 shows an example of RF switching time during switching from LTE V2X to NR V2X.

According to the example of FIG. 11, RF switching (e.g., RF switching when a UE switches a communication method from LTE V2X communication to NR V2X communication) may be performed between the last evolved universal terrestrial radio access (E-UTRA) (or LTE) subframe of LTE V2X and the first slot of NR V2X. FIG. 11 shows an example of RF switching time necessary for switching from LTE V2X to NR V2X.

A time is required until NR V2X RF is stabilized from the boundary between LTE V2X and NR V2X, and interruption may be applied to NR V2X during this time. In the first example of the present disclosure, 130 μs to 220 μs is exemplified as the required time (interruption time to NR V2X). Specifically, an E-UTRA transient period of 20 μs may be applied to an E-UTRA subframe based on the boundary between LTE V2X and NR V2X. In addition, an RF retuning time of 120 μs to 210 μs may be applied in an NR V2X slot, and an NR transient period of 10 μs may be applied after the RF retuning time based on the boundary between LTE V2X and NR V2X. Therefore, a total interruption time of 130 μs to 220 μs can be applied to the NR V2X slot.

The example of FIG. 11 shows the number of slots to which an interruption time of 130 μs to 220 μs is applied when the SCS of NR V2X is 15 kHz, 30 kHz, and 60 kHz. Referring to the example of FIG. 11, when the SCS of NR V2X is 15 kHz, 30 kHz, and 60 kHz, interruption may occur in 1 slot of NR V2X.

In the second example of the present disclosure, when a UE switches a communication method from LTE V2X to NR V2X through the TDM method using the same RF, 1 slot interruption is defined in NR V2X for all SCSs (e.g., 15 kHz, 30 kHz, and 60 kHz) of NR V2X.

The following drawings were created to explain a specific example of the present disclosure. Since the names of specific devices described in the drawings or the names of specific signals/messages/fields are presented by way of example, the technical features of the present disclosure are not limited to the specific names used in the following drawings.

Figure 12:
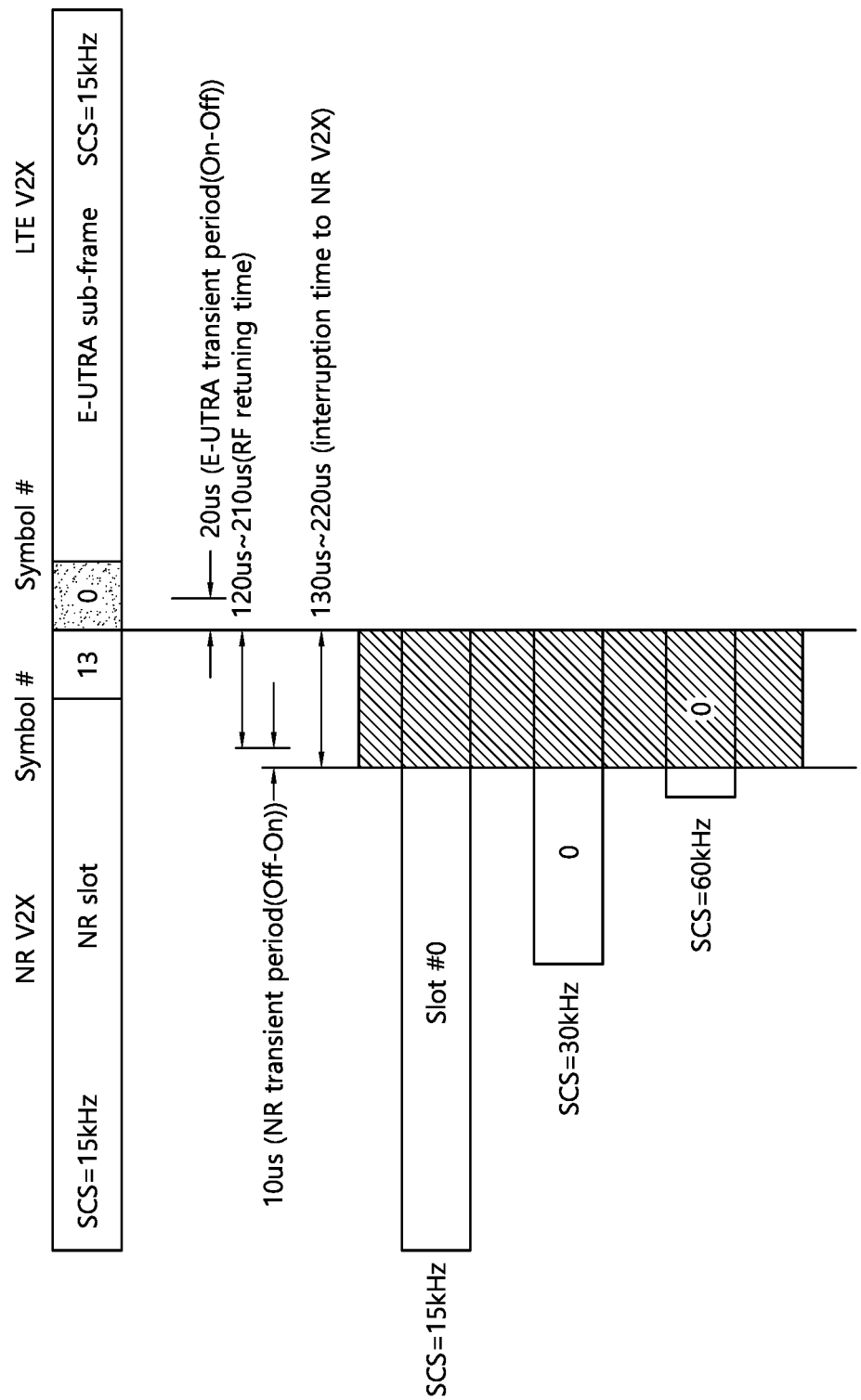
FIG. 12 shows an example of RF switching time during switching from NR V2X to LTE V2X according to the first example of the present disclosure.

FIG. 12 shows an example of RF switching time during switching from NR V2X to LTE V2X according to the first example of the present disclosure.

FIG. 12 shows an example of RF switching time during switching from NR V2X to LTE V2X.

According to the example of FIG. 11, RF switching (e.g., RF switching when a UE switches a communication method from NR V2X communication to LTE V2X communication) may be performed between the last slot of NR V2X and the first subframe of LTE V2X. FIG. 12 shows an example of RF switching time required for switching from NR V2X to LTE V2X.

To ensure stable LTE V2X communication (e.g., transmit and receive), RF needs to be stabilized before the boundary between NR V2X and LTE V2X. That is, RF needs to be stabilized within the last slot of NR V2X, and interruption can be applied to NR V2X during this time (e.g., an interruption time of 130 μs to 220 μs). In the first example of the present disclosure, 130 μs to 220 μs is exemplified as the required time (interruption time to NR V2X). Specifically, an RF retuning time of 120 μs to 210 μs may be applied in an NR V2X slot and an NR transient period of 10 μs may be applied before the RF retuning time based on the boundary between NR V2X and LTE V2X. In addition, an E-UTRA transient period of 20 us may be applied to an E-UTRA subframe based on the boundary between NR V2X and LTE V2X. Therefore, a total interruption time of 130 μs to 220 μs can be applied to the NR V2X slot.

The example of FIG. 12 shows a slot to which an interruption time of 130 μs to 220 μs is applied when the SCS of NR V2X is 15 kHz, 30 kHz, and 60 kHz. Since a gap symbol can be configured in the rear part of the NR V2X slot, actual interruption for the NR V2X slot during the interruption time may vary depending on the NR SCS and the number of data symbols ($l_d$ or the number of gap symbols) of 1 slot of a physical channel (PSSCH & PSCCH).

Therefore, in the first example of the present disclosure, a method of defining the number of interrupted NR V2X slots depending on the NR SCS and the number of data symbols ($l_d$ or the number of gap symbols) of 1 slot of a physical channel (PSSCH & PSCCH) in the case of a UE that uses a common RF (e.g., the same RF) during switching from NR V2X to LTE V2X using the same RF is proposed.

Hereinafter, an example of interruption during switching from NR V2X to LTE V2X will be described with reference to FIGS. 13 to 15, and the number of interrupted NR V2X slots according thereto is defined.

The following drawings were created to explain a specific example of the present disclosure. Since the names of specific devices described in the drawings or the names of specific signals/messages/fields are presented by way of example, the technical features of the present disclosure are not limited to the specific names used in the following drawings.

Figure 13:
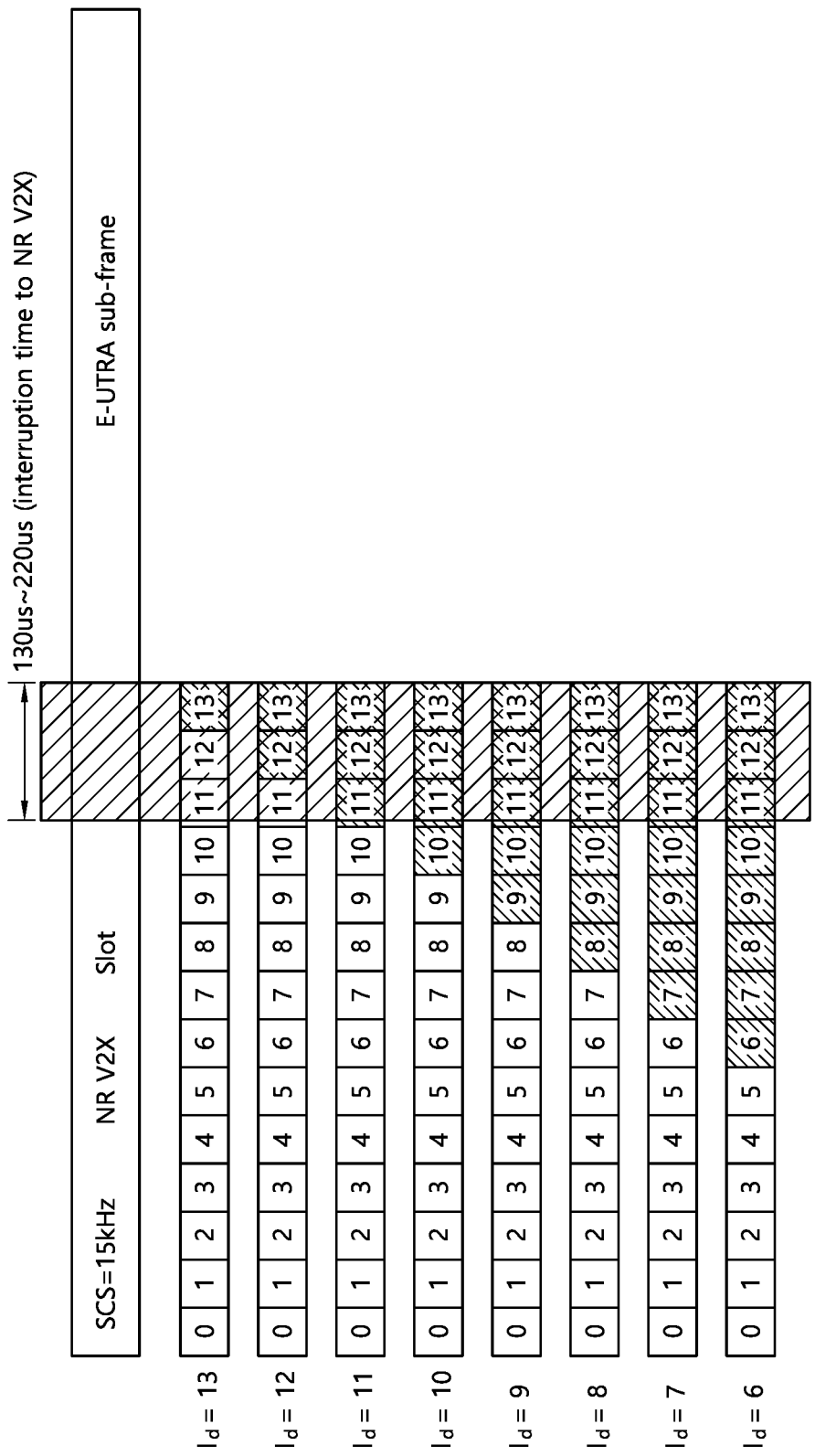
FIG. 13 shows an example of interruption when an SCS of NR V2X is 15 kHz in the first example of the present disclosure.

FIG. 13 shows an example of interruption when the SCS of NR V2X is 15 kHz in the first example of the present disclosure.

FIG. 13 shows an example of interruption in NR V2X when the SCS is 15 kHz during switching from NR V2X to LTE V2X (e.g., when a UE switches a communication method from NR V2X communication to LTE V2X communication).

When the SCS is 15 kHz, the duration of 1 slot is 1 ms. Since 1 slot includes 14 symbols, the duration of 1 symbol is about 71.5 μs (1 ms/14). As defined through the example of FIG. 12, an interruption time of 130 μs to 220 μs may be applied to the last slot of NR V2X.

As in the example of FIG. 13, a case in which interruption occurs in one NR V2X slot and a case in which interruption does not occur may be distinguished according to the number $l_d$ of PSSCH symbols constituting one NR V2X slot. This is because, when an interruption time is applied only to gap symbols, interruption may not be applied to symbols used for data transmission and reception. In this case, interruption may not be applied to NR V2X symbols. Therefore, in order to minimize NR V2X interruption, the number of interruption slots may be differently defined according to the number of PSSCH symbols, as shown in the table below.

TABLE 4

| | Number of PSSCH symbols ($l_d$) | | | | | | | |
|---|---|---|---|---|---|---|---|---|
| SCS = 15 kHz | 6 | 7 | 8 | 9 | 10 | 11 | 12 | 13 |
| Number of interrupted NR V2X slots | 0 | 0 | 0 | 0 | 0 | 0 | 1 | 1 |

Referring to the example of Table 4 and the example of FIG. 13, when $l_d$ is 13, an interruption time is applied to data symbols (symbol 11 and symbol 12), and thus interruption is applied to the last NR V2X slot. Therefore, the number of interrupted NR V2X slots becomes 1. When $l_d$ is 6, since the interruption time is applied to gap symbols (symbol 11, symbol 12, and symbol 13), interruption is not applied to the last NR V2X slot. Therefore, the number of interrupted NR V2X slots becomes 0. That is, in the example of Table 4, the number of interrupted NR V2X slots may be 0 when $l_a$ is 6 to 11, and the number of interrupted NR V2X slots may be 1 when $l_a$ is 12 and 13.

The following drawings were created to explain a specific example of the present disclosure. Since the names of specific devices described in the drawings or the names of specific signals/messages/fields are presented by way of example, the technical features of the present disclosure are not limited to the specific names used in the following drawings.

Figure 14:
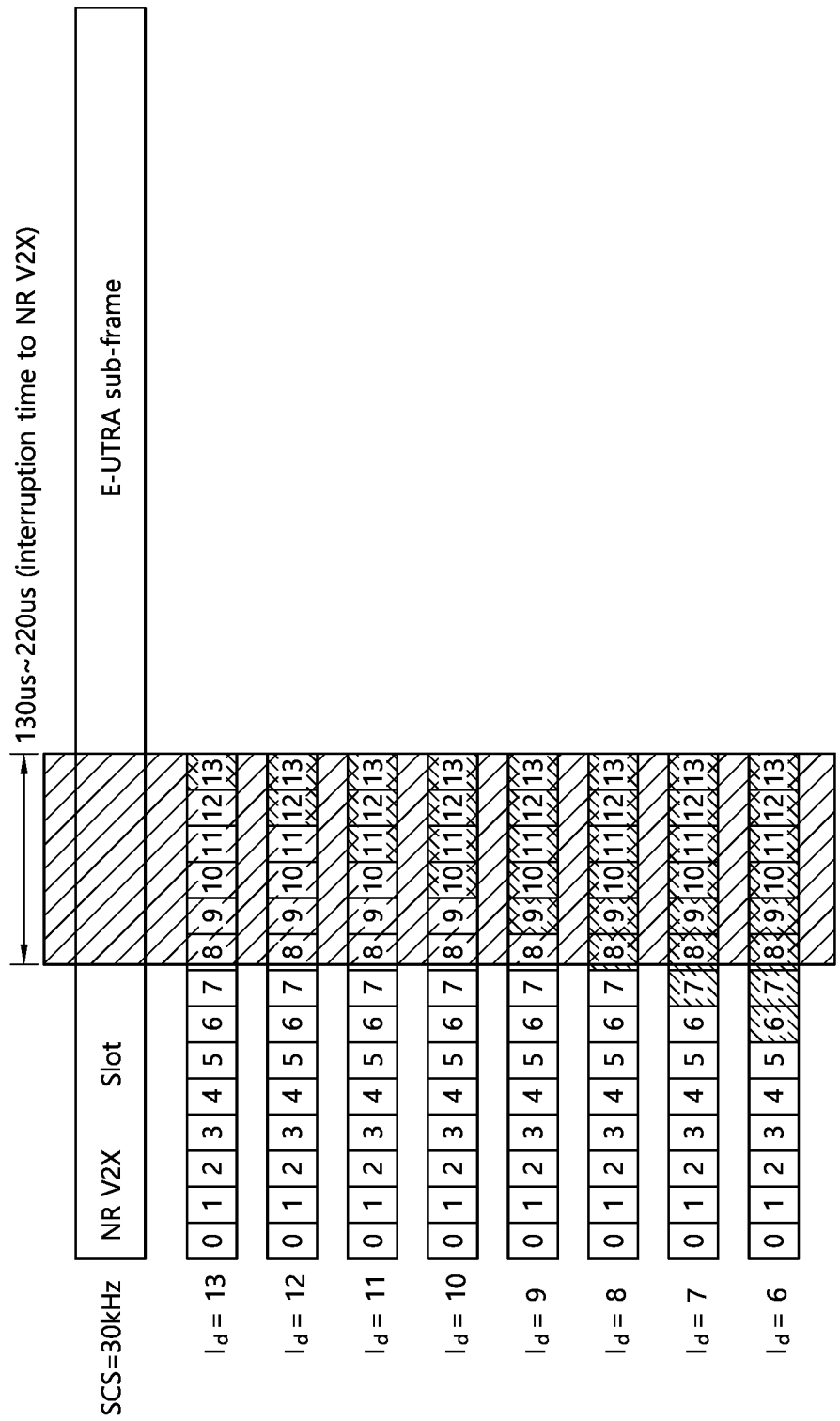
FIG. 14 shows an example of interruption when the SCS of NR V2X is 30 kHz in the first example of the present disclosure.

FIG. 14 shows an example of interruption when the SCS of NR V2X is 30 kHz in the first example of the present disclosure.

FIG. 14 shows an example of interruption in NR V2X when the SCS is 30 kHz during switching from NR V2X to LTE V2X (e.g., when a UE switches a communication method from NR V2X communication to LTE V2X communication).

When the SCS is 30 kHz, the duration of 1 slot is 0.5 ms. Since 1 slot includes 14 symbols, the duration of 1 symbol is about 35.7 μs (0.5 ms/14). As defined through the example of FIG. 12, an interruption time of 130 μs to 220 μs may be applied to the last slot of NR V2X.

As in the example of FIG. 14, a case in which interruption occurs in one NR V2X slot and a case in which interruption does not occur may be distinguished according to the number $l_a$ of PSSCH symbols constituting one NR V2X slot. This is because, when an interruption time is applied only to gap symbols, interruption may not be applied to symbols used for data transmission and reception. In this case, interruption may not be applied to NR V2X symbols. Therefore, in order to minimize NR V2X interruption, the number of interruption slots may be differently defined according to the number of PSSCH symbols, as shown in the table below.

TABLE 5

| | Number of PSSCH symbols ($l_d$) | | | | | | | |
|---|---|---|---|---|---|---|---|---|
| SCS = 30 kHz | 6 | 7 | 8 | 9 | 10 | 11 | 12 | 13 |
| Number of interrupted NR V2X slots | 0 | 0 | 0 | 1 | 1 | 1 | 1 | 1 |

Referring to the example of Table 5 and the example of FIG. 14, when $l_a$ is 13, an interruption time is applied to data symbols (symbol 8, symbol 9, symbol 10, symbol 11, and symbol 12) and thus interruption is applied to the last NR V2X slot. Therefore, the number of interrupted NR V2X slots becomes 1. When $l_a$ is 6, since the interruption time is applied to gap symbols (symbol 8, symbol 9, symbol 10, symbol 11, symbol 12, and symbol 13), interruption is not applied to the last NR V2X slot. Therefore, the number of interrupted NR V2X slots becomes 0. That is, in the example of Table 5, the number of interrupted NR V2X slots may be 0 when $l_a$ is 6 to 8, and the number of interrupted NR V2X slots may be 1 when $l_a$ is 9 to 13.

The following drawings were created to explain a specific example of the present disclosure. Since the names of specific devices described in the drawings or the names of specific signals/messages/fields are presented by way of example, the technical features of the present disclosure are not limited to the specific names used in the following drawings.

Figure 15:
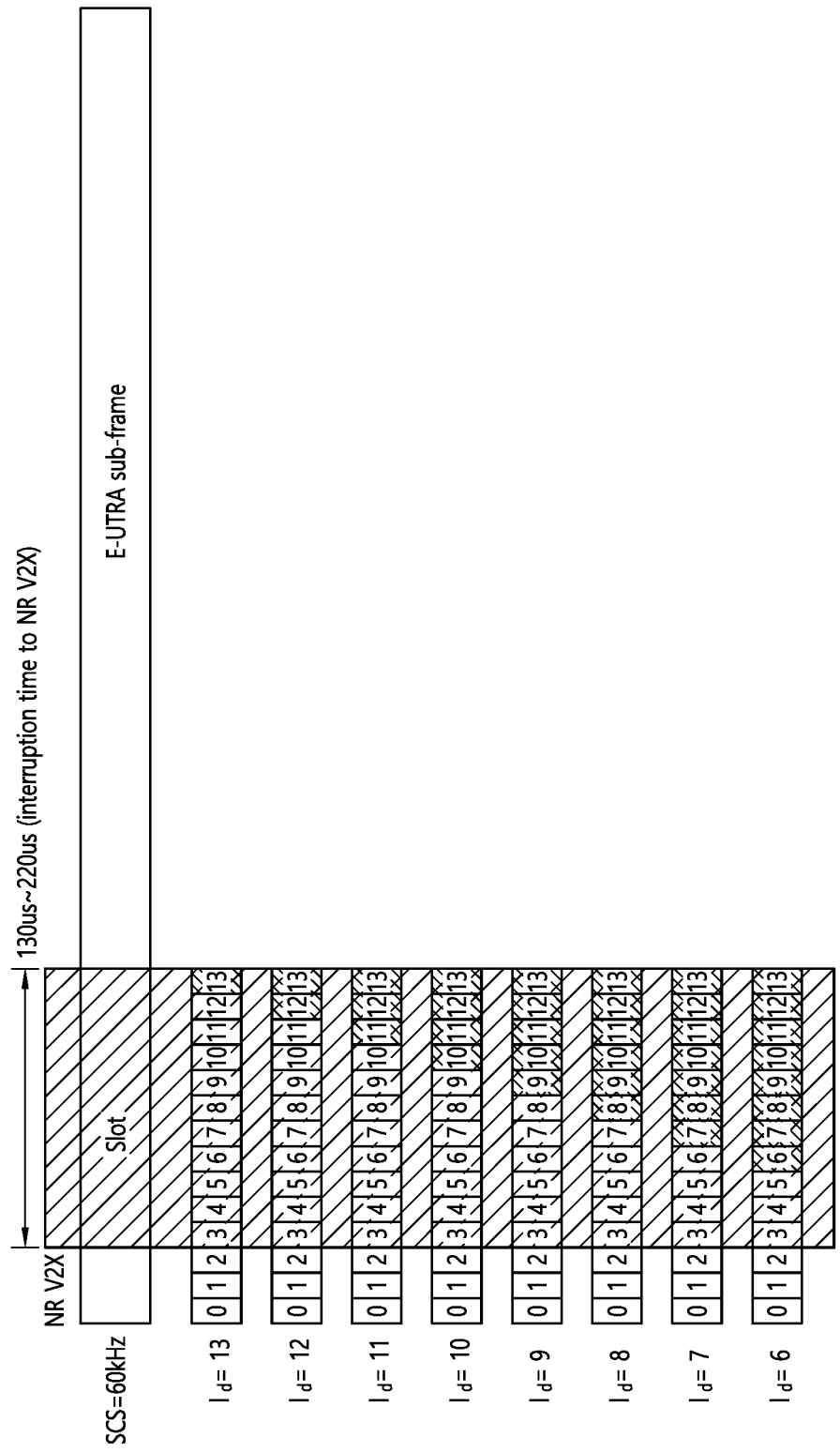
FIG. 15 shows an example of interruption when the SCS of NR V2X is 60 kHz in the first example of the present disclosure.

FIG. 15 shows an example of interruption when the SCS of NR V2X is 60 kHz in the first example of the present disclosure.

FIG. 15 shows an example of interruption in NR V2X when the SCS is 15 kHz during switching from NR V2X to LTE V2X (e.g., when a UE switches a communication method from NR V2X communication to LTE V2X communication).

When the SCS is 60 kHz, the duration of 1 slot is 0.25 ms. Since 1 slot includes 14 symbols, the duration of 1 symbol is about 17.9 μs (0.25 ms/14). As defined through the example of FIG. 12, an interruption time of 130 μs to 220 μs may be applied to the last slot of NR V2X.

As in the example of FIG. 15, when the SCS of NR V2X is 60 kHz, interruption occurs in one NR V2X slot irrespective of the number $l_d$ of PSSCH symbols constituting one NR V2X slot. This is because interruption is applied to symbols used for data transmission and reception in cases in which the number $l_d$ of symbols is 6 to 13. When the SCS of NR V2X is 60 kHz, the number of interruption slots may be defined according to the number of PSSCH symbols, as shown in the table below.

TABLE 6

| | Number of PSSCH symbols ($l_d$) | | | | | | | |
|---|---|---|---|---|---|---|---|---|
| SCS = 60 kHz | 6 | 7 | 8 | 9 | 10 | 11 | 12 | 13 |
| Number of interrupted NR V2X slots | 1 | 1 | 1 | 1 | 1 | 1 | 1 | 1 |

Referring to the example of Table 6 and the example of FIG. 15, when the SCS of NR V2X is 60 kHz, the number of interrupted NR V2X slots is always 1 regardless of $l_d$.

The examples of Tables 4 to 6 and the examples of FIGS. 12 to 15 are summarized as in Table 7 below. That is, the example of Table 7 is an example of arrangement of an NR V2X interruption slot of a UE using a common RF during switching from NR V2X to LTE V2X.

TABLE 7

| | Number of PSSCH symbols ($l_d$) | | | | | | | |
|---|---|---|---|---|---|---|---|---|
| | 6 | 7 | 8 | 9 | 10 | 11 | 12 | 13 |
| SCS = 15 kHz | 0 | 0 | 0 | 0 | 0 | 0 | 1 | 1 |
| SCS = 30 kHz | 0 | 0 | 0 | 1 | 1 | 1 | 1 | 1 |
| SCS = 60 kHz | 1 | 1 | 1 | 1 | 1 | 1 | 1 | 1 |

Table 7 shows an example of the number of NR V2X interruption slots in the case of a UE using a common RF during switching from NR V2X to LTE V2X.

According to the first example of the present disclosure, during switching from NR V2X to LTE V2X using the same RF, the number of interrupted NR V2X slots is defined according to the NR SCS and the number of data symbols ($l_d$ or the number of gap symbols) of 1 slot of a physical channel (PSSCH & PSCCH) when NR V2X is a normal CP in the case of a UE using a common RF, as shown in Table 7.

Even when the extended CP is used for NR V2X, the principle used in the normal CP may be applied to define the number of interrupted NR V2X slots depending on the NR SCS and the number of data symbols ($l_d$ or the number of gap symbols) of 1 slot of a physical channel (PSSCH & PSCCH).

2. Second Example of Present Disclosure

The following drawings were created to explain a specific example of the present disclosure. Since the names of specific devices described in the drawings or the names of specific signals/messages/fields are presented by way of example, the technical features of the present disclosure are not limited to the specific names used in the following drawings.

RF switching may occur between an LTE V2X sub-frame and an NR V2X slot. A UE may transmit security-related information, safety-related information, and data through LTE V2X communication. In addition, the UE may transmit data through NR V2X communication. Since the UE transmits security-related information and safety-related information through LTE V2X communication, LTE V2X communication (e.g., transmission) may be more important than NR V2X communication.

However, both LTE V2X and NR V2X can support basic safety use cases (including other use cases). For a UE supporting both LTE V2X and NR V2X using TDM, packet priority for LTE V2X and NR V2X may be provided. Here, the packet priority may mean respective priorities of LTE V2X and NR V2X. For example, a base station may transmit information on the packet priority of LTE V2X and the packet priority of NR V2X to the UE. As another example, the UE may store a preset packet priority. On the other hand, for a UE supporting both LTE V2X and NR V2X using TDM, it may not always be guaranteed that packet priority for LTE V2X and NR V2X is provided. Further, the priority of LTE V2X may be the same as the priority of NR V2X regardless of given packet priorities.

Therefore, scenarios to be considered may be more complicated. For example, in order to support efficient V2X operation of a UE, there may be various scenarios to be considered. In general, NR V2X may be implemented by supplementing legacy LTE V2X. This may mean that legacy LTE V2X should not be affected by addition of technology for NR V2X communication. Therefore, in consideration of simplicity and ensuring that LTE V2X is not affected, it may be reasonable to apply a switching time and interruption related to the switching time to NR V2X slots for switching between LTE V2X and NR V2X. However, a case where a switching time occurs in an LTE V2X subframe may not be excluded. In other words, for switching between LTE V2X and NR V2X, a switching time and interruption related to the switching time may be applied to LTE V2X subframes.

Whether a UE applies an RF switching time to LTE V2X subframes or NR V2X slots may be determined through the following operations.

When a packet priority is provided to the UE (when a base station transmits the packet priority of LTE V2X and the packet priority of NR V2X to the UE, or the UE stores preset packet priorities), the following operation may be performed. The UE may select a radio access technology (RAT) having a lower packet priority by comparing the packet priority of LTE V2X with the packet priority of NR V2X. When the packet priority of LTE V2X is the same as the packet priority of NR V2X, the UE may select the RAT by itself. For the selected RAT, an RF switching time and/or interruption may be applied. For RAT to which the RF switching time and/or interruption are applied, the UE may not expect transmission or reception of a corresponding RAT signal in a slot or a subframe to which the RF switching time and/or interruption are applied.

When a packet priority is not provided to the UE, the following operation may be performed. The UE may determine which RAT will be selected from among LTE V2X and NR V2X. For the selected RAT, an RF switching time and/or interruption may be applied. For the RAT to which the RF switching time and/or interruption are applied, the UE may not expect transmission and/or reception of a corresponding RAT signal in a slot or a subframe to which the RF switching time and/or interruption are applied.

In the second example of the present disclosure, it is assumed that a switching time between an LTE subframe and an NR slot in Intelligent Transport System (ITS) band (B47/n47) is 140 µs to 210 µs. For reference, the switching time in the second example of the present disclosure may be used as the same meaning as "RF switching time" or "interruption time" described in the first example of the present disclosure. Hereinafter, an efficient V2X operation of a UE is proposed on the assumption that switching time candidates are 140 µs, 150 µs, and 210 µs.

First, an example in which RF switching is performed in an NR slot during switching from NR sidelink (SL) to LTE SL will be described. That is, during switching from an NR slot to an LTE subframe, a switching time may be applied to the NR slot.

In this case, the NR slot to which the switching time is applied may be, for example, as follows:
PSCCH/PSSCH without PSFCH;
PSCCH/PSSCH with PSFCH;
PSPSS/PSSSS/PSBCH.

Interruption for each NR slot is analyzed below.

Here, the PSFCH may always be located in the 12th symbol and the 13th symbol in the NR slot.

Hereinafter, an RF switching time and the number of interrupted symbols applied to an NR slot (e.g., PSCCH/PSSCH slot without PSFCH) are analyzed focusing on an example of an RF switching time for "PSCCH/PSSCH slot without PSFCH" with reference to FIGS. 16 to 18.

Figure 16:
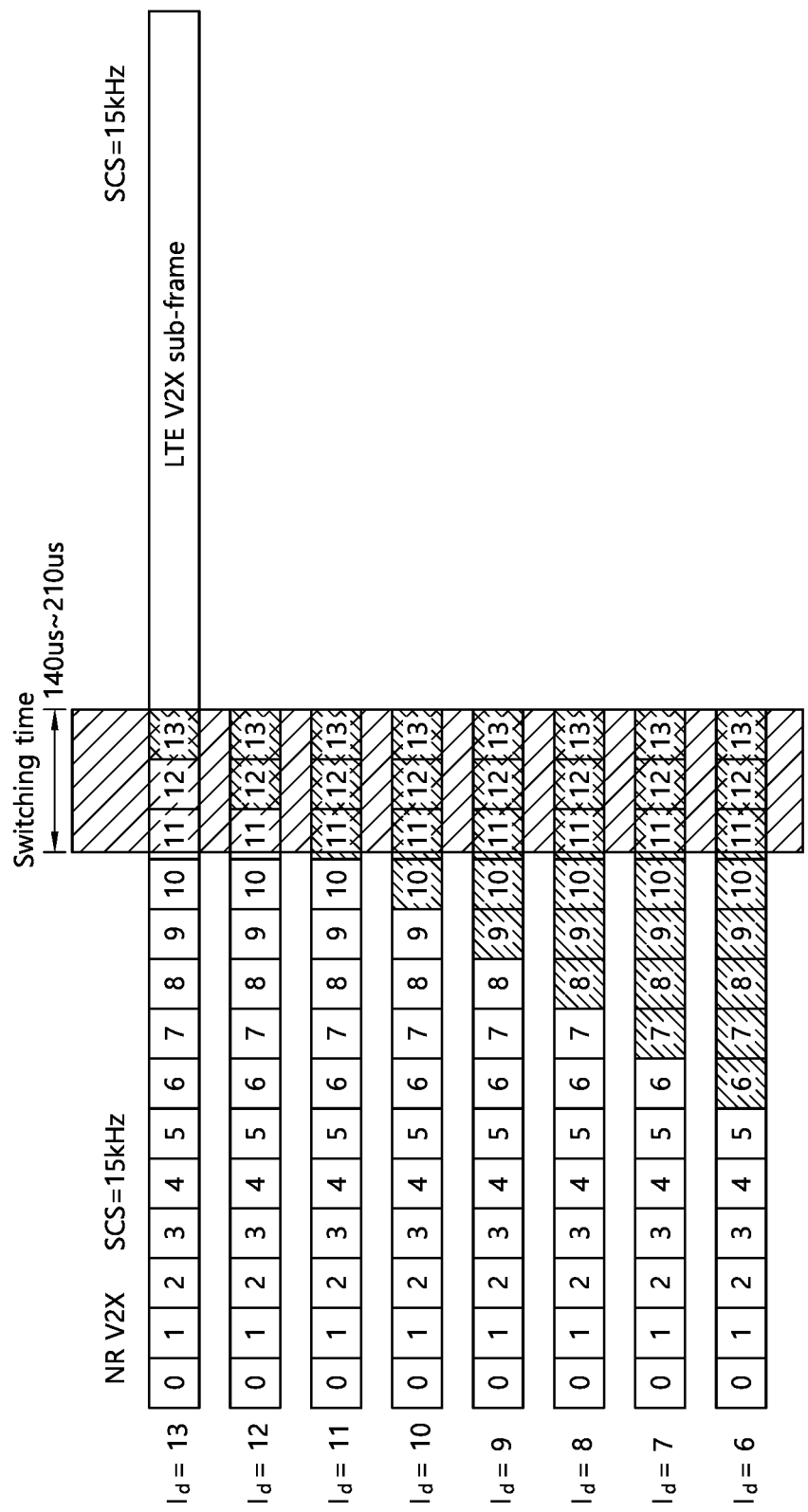
FIG. 16 shows an example of interruption when the SCS of NR V2X is 15 kHz in a second example of the present disclosure.
Figure 17:
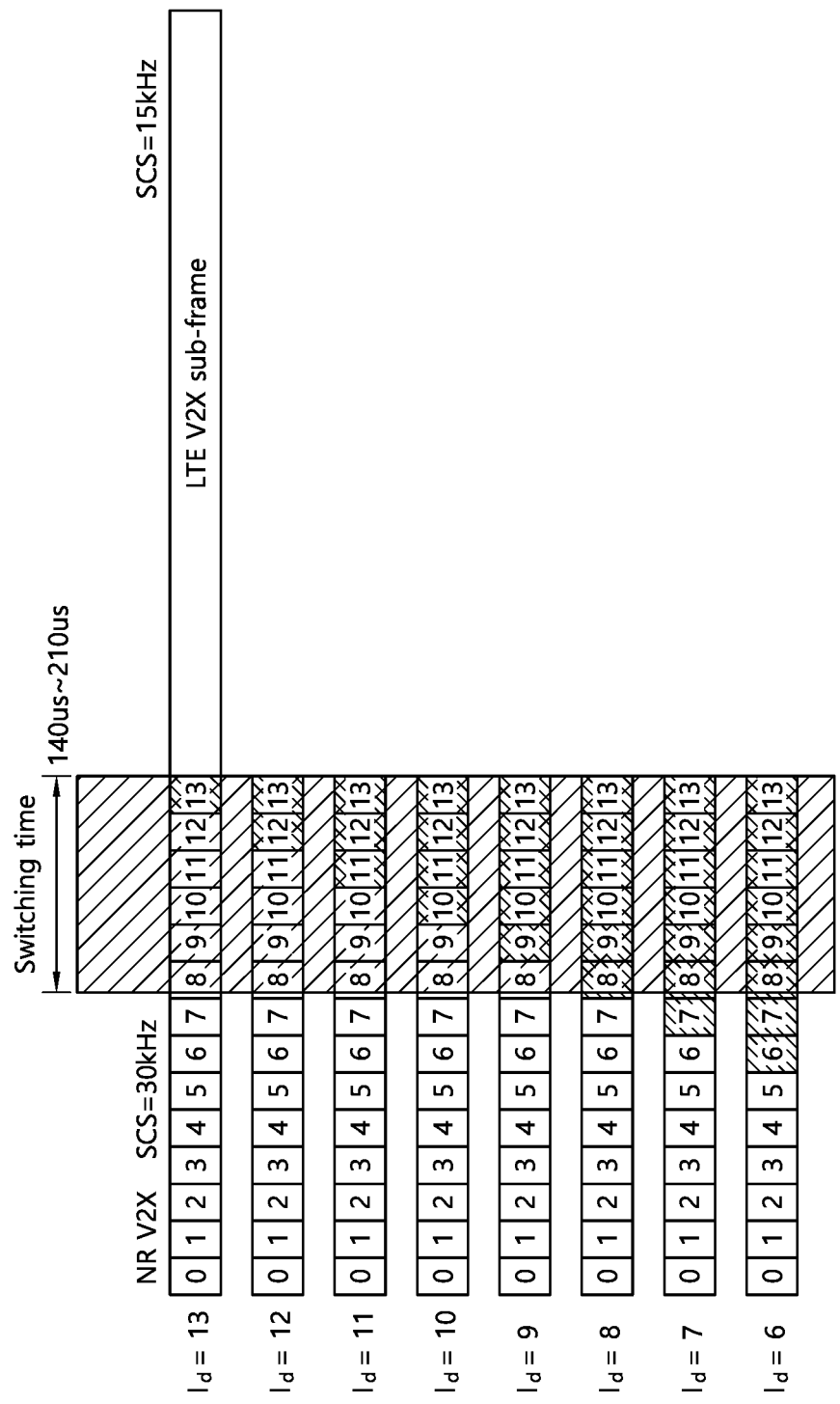
FIG. 17 shows an example of interruption when the SCS of NR V2X is 30 kHz in the second example of the present disclosure.
Figure 18:
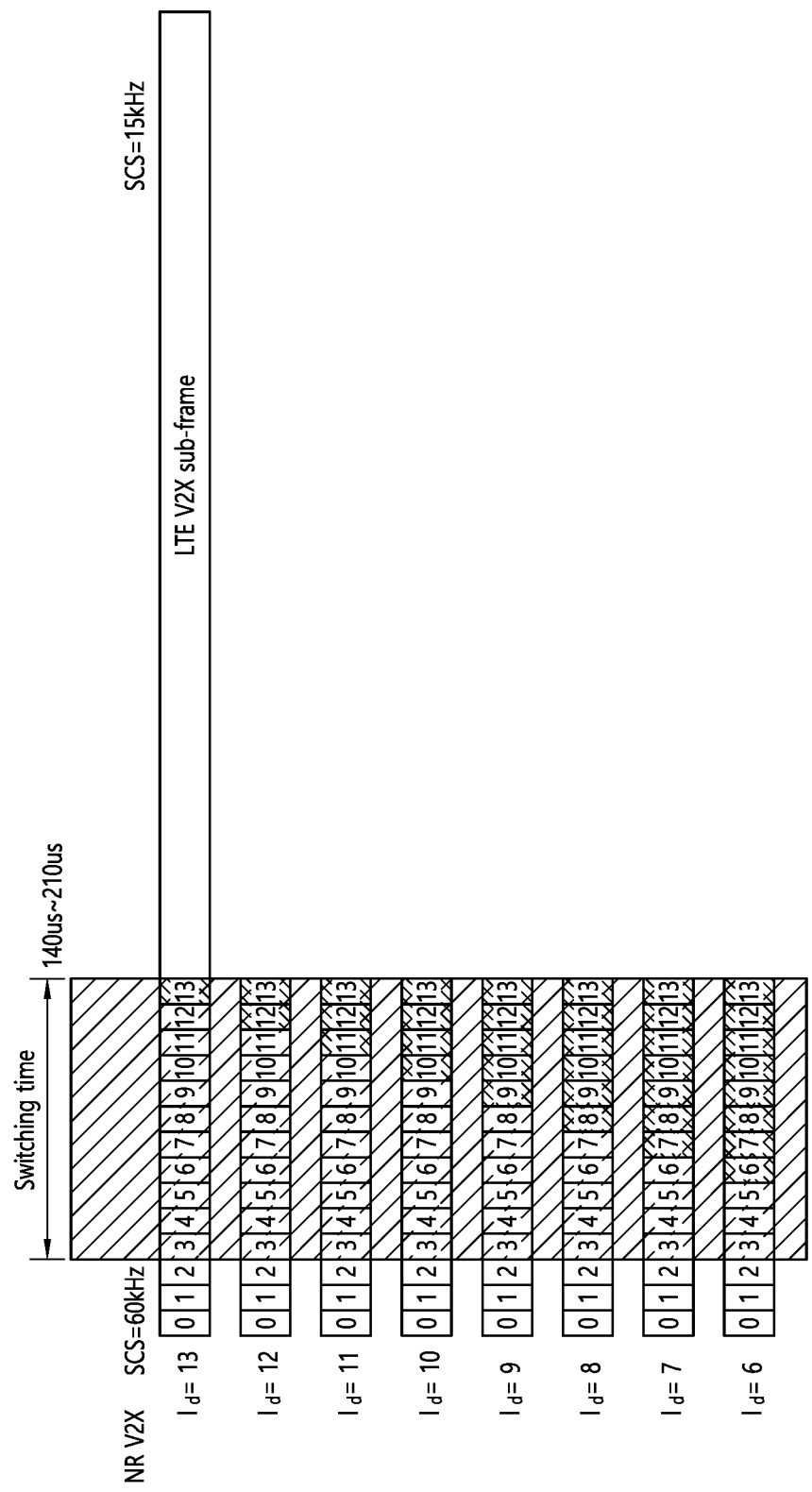
FIG. 18 shows an example of interruption when the SCS of NR V2X is 60 kHz in the second example of the present disclosure.

Referring to examples of FIGS. 16 to 18, when switching from NR SL to LTE SL is performed in "PSCCH/PSSCH slot without PSFCH", the number of interrupted symbols may vary according to both the SCS and the number of configured symbols, $l_d$.

The following drawings were created to explain a specific example of the present disclosure. Since the names of specific devices described in the drawings or the names of specific signals/messages/fields are presented by way of example, the technical features of the present disclosure are not limited to the specific names used in the following drawings.

FIG. 16 shows an example of interruption when the SCS of NR V2X is 15 kHz in the second example of the present disclosure.

FIG. 16 shows an example of interruption in an NR V2X slot when the SCS is 15 kHz during switching from NR SL to LTE SL (e.g., when a UE switches a communication method from NR V2X communication to LTE V2X communication). In the example of FIG. 16, it is assumed that the last NR V2X slot adjacent to the boundary between an NR V2X slot and an LTE subframe is "PSCCH/PSSCH slot without PSFCH".

When the SCS is 15 kHz, the duration of 1 slot is 1 ms. Since 1 slot includes 14 symbols, the duration of 1 symbol is about 71.5 µs (1 ms/14). A switching time of 140 µs to 210 µs may be applied to the last slot of NR V2X.

As in the example of FIG. 16, a case in which interruption occurs in one NR V2X slot and a case in which interruption does not occur may be distinguished according to the number $l_d$ of PSSCH symbols constituting one NR V2X slot. This is because, when the switching time is applied only to gap symbols, interruption may not be applied to symbols used for data transmission and reception. In this case, interruption may not be applied to NR V2X symbols.

Among the switching times of 140 μs to 210 μs in the example of FIG. 16, the number of interrupted NR symbols when switching times of 140 μs, 150 μs, and 210 μs are used are analyzed as follows. If the switching time of 140 μs or 150 μs is used, interruption may occur in 2 symbols (last 2 symbols). If the switching time of 210 μs is used, interruption may occur in 3 symbols (last 3 symbols). The number of interrupted NR symbols can be summarized as shown in Table 8 below.

The number of interrupted NR slots when the switching times of 140 μs, 150 μs, and 210 μs are used among the switching times of 140 μs to 210 μs in the example of FIG. 16 may vary according to the number of symbols, $l_d$. The number of interrupted NR slots is analyzed as follows.

When the switching time of 140 μs or 150 μs is used, interruption occurs in 2 symbols (last 2 symbols), and thus the number of interrupted NR slots is 0 when $l_d$ is 6 to 11. When $l_d$ is 12 and 13, the number of interrupted NR slots is 1.

When the switching time of 210 μs is used, interruption occurs in 3 symbols (last 3 symbols), and thus the number of interrupted NR slots is 0 when $l_d$ is 6 to 10. When $l_d$ is 11 to 13, the number of interrupted NR slots is 1.

The number of interrupted NR slots can be summarized as shown in Table 9 below.

The following drawings were created to explain a specific example of the present disclosure. Since the names of specific devices described in the drawings or the names of specific signals/messages/fields are presented by way of example, the technical features of the present disclosure are not limited to the specific names used in the following drawings.

FIG. 17 shows an example of interruption when the SCS of NR V2X is 30 kHz in the second example of the present disclosure.

FIG. 17 shows an example of interruption in an NR V2X slot when the SCS is 30 kHz during switching from NR SL to LTE SL (e.g., when a UE switches a communication method from NR V2X communication to LTE V2X communication). In the example of FIG. 17, it is assumed that the last NR V2X slot adjacent to the boundary between an NR V2X slot and an LTE subframe is "PSCCH/PSSCH slot without PSFCH".

When the SCS is 30 kHz, the duration of 1 slot is 0.5 ms. Since 1 slot includes 14 symbols, the duration of 1 symbol is about 35.7 μs (0.5 ms/14). A switching time of 140 μs to 210 μs may be applied to the last slot of NR V2X.

As in the example of FIG. 17, a case in which interruption occurs in one NR V2X slot and a case in which interruption does not occur may be distinguished according to the number $l_d$ of PSSCH symbols constituting one NR V2X slot. This is because, when the switching time is applied only to gap symbols, interruption may not be applied to symbols used for data transmission and reception. In this case, interruption may not be applied to NR V2X symbols.

Among the switching times of 140 μs to 210 μs in the example of FIG. 17, the number of interrupted NR symbols when switching times of 140 μs, 150 μs, and 210 μs are used are analyzed as follows.

If the switching time of 140 μs is used, interruption may occur in 4 symbols (last 4 symbols). If the switching time of 150 μs is used, interruption may occur in 5 symbols (last 5 symbols). If the switching time of 210 μs is used, interruption may occur in 6 symbols (last 6 symbols). The number of interrupted NR symbols can be summarized as shown in Table 8 below.

The number of interrupted NR slots when the switching times of 140 μs, 150 μs, and 210 μs are used among the switching times of 140 μs to 210 μs in the example of FIG. 17 may vary according to the number of symbols, $l_d$. The number of interrupted NR slots is analyzed as follows.

When the switching time of 140 μs is used, interruption occurs in 4 symbols (last 4 symbols), and thus the number of interrupted NR slots is 0 when $l_a$ is 6 to 9. When $l_a$ is 10 to 13, the number of interrupted NR slots is 1.

When the switching time of 150 μs is used, interruption occurs in 5 symbols (last 5 symbols), and thus the number of interrupted NR slots is 0 when $l_a$ is 6 to 8. When $l_a$ is 9 to 13, the number of interrupted NR slots is 1.

When the switching time of 210 μs is used, interruption occurs in 6 symbols (last 6 symbols), and thus the number of interrupted NR slots is 0 when $l_a$ is 6 and 7. When $l_a$ is 8 to 13, the number of interrupted NR slots is 1.

The number of interrupted NR slots can be summarized as shown in Table 9 below.

The following drawings were created to explain a specific example of the present disclosure. Since the names of specific devices described in the drawings or the names of specific signals/messages/fields are presented by way of example, the technical features of the present disclosure are not limited to the specific names used in the following drawings.

FIG. 18 shows an example of interruption when the SCS of NR V2X is 60 kHz in the second example of the present disclosure.

FIG. 18 shows an example of interruption in an NR V2X slot when the SCS is 60 kHz during switching from NR SL to LTE SL (e.g., when a UE switches a communication method from NR V2X communication to LTE V2X communication). In the example of FIG. 18, it is assumed that the last NR V2X slot adjacent to the boundary between an NR V2X slot and an LTE subframe is "PSCCH/PSSCH slot without PSFCH".

When the SCS is 60 kHz, the duration of 1 slot is 0.25 ms. Since 1 slot includes 14 symbols, the duration of 1 symbol is about 17.9 μs (0.25 ms/14). An interruption time of 130 μs to 220 μs may be applied to the last slot of NR V2X, as defined in the example of FIG. 12.

As in the example of FIG. 18, a case in which interruption occurs in one NR V2X slot and a case in which interruption does not occur may be distinguished according to the number $l_d$ of PSSCH symbols constituting one NR V2X slot. This is because, when the switching time is applied only to gap symbols, interruption may not be applied to symbols used for data transmission and reception. In this case, interruption may not be applied to NR V2X symbols.

Among the switching times of 140 μs to 210 μs in the example of FIG. 18, the number of interrupted NR symbols when switching times of 140 μs, 150 μs, and 210 μs are used are analyzed as follows.

If the switching time of 140 μs is used, interruption may occur in 8 symbols (last 8 symbols). If the switching time of 150 μs is used, interruption may occur in 9 symbols (last 9 symbols). If the switching time of 210 μs is used, interruption may occur in 12 symbols (last 12 symbols). The number of interrupted NR symbols can be summarized as shown in Table 8 below.

The number of interrupted NR slots when the switching times of 140 μs, 150 μs, and 210 μs are used among the switching times of 140 μs to 210 μs in the example of FIG.

18 may vary according to the number of symbols, $l_d$. The number of interrupted NR slots is analyzed as follows.

When the switching time of 140 μs is used, interruption occurs in 8 symbols (last 8 symbols), and thus the number of interrupted NR slots is 1 for all values of $l_d$.

When the switching time of 150 μs is used, interruption occurs in 9 symbols (last 9 symbols), and thus the number of interrupted NR slots is 1 for all values of $l_d$.

When the switching time of 210 μs is used, interruption occurs in 12 symbols (last 12 symbols), and thus the number of interrupted NR slots is 1 for all values of $l_d$.

The number of interrupted NR slots can be summarized as shown in Table 9 below.

The number of interrupted NR symbols analyzed with reference to the examples of FIGS. 16 to 18 can be summarized as Table 8 below. The number of interrupted NR slots analyzed with reference to the examples of FIGS. 16 to 18 can be summarized as shown in Table 9 below. For reference, in the examples of Table 8 and Table 9 below, the NR slot may be "PSCCH/PSSCH slot without PSFCH".

TABLE 8

| Switching | # of interrupted symbols | | |
|---|---|---|---|
| time (μs) | SCS = 15 kHz | SCS = 30 kHz | SCS = 60 kHz |
| 140 | 2 | 4 | 8 |
| 150 | 2 | 5 | 9 |
| 210 | 3 | 6 | 12 |

The example in Table 8 shows a result of analyzing the examples of FIGS. 16 to 18. The example of Table 8 shows the number of interrupted NR symbols in each SCS (15 kHz, 30 kHz, and 60 kHz) when the switching time is 140 μs, 150 μs, and 210 μs.

TABLE 9

| | # of interrupted slot | | | | | | | | |
|---|---|---|---|---|---|---|---|---|---|
| | Switching time of 140 μs | | | Switching time of 150 μs | | | Switching time of 210 μs | | |
| ld | SCS = 15 kHz | SCS = 30 kHz | SCS = 60 kHz | SCS = 15 kHz | SCS = 30 kHz | SCS = 60 kHz | SCS = 15 kHz | SCS = 30 kHz | SCS = 60 kHz |
| 6 | 0 | 0 | 1 | 0 | 0 | 1 | 0 | 0 | 1 |
| 7 | 0 | 0 | 1 | 0 | 0 | 1 | 0 | 0 | 1 |
| 8 | 0 | 0 | 1 | 0 | 0 | 1 | 0 | 1 | 1 |
| 9 | 0 | 0 | 1 | 0 | 1 | 1 | 0 | 1 | 1 |
| 10 | 0 | 1 | 1 | 0 | 1 | 1 | 0 | 1 | 1 |
| 11 | 0 | 1 | 1 | 0 | 1 | 1 | 1 | 1 | 1 |
| 12 | 1 | 1 | 1 | 1 | 1 | 1 | 1 | 1 | 1 |
| 13 | 1 | 1 | 1 | 1 | 1 | 1 | 1 | 1 | 1 |

The example of Table 9 shows a result of analyzing the examples of FIGS. 16 to 18. The example of Table 9 shows the number of interrupted NR slots according to each SCS (15 kHz, 30 kHz, 60 kHz) and the number of configured symbols, $l_d$, when the switching time is 140 μs, 150 μs, and 210 μs. The number of interrupted NR slots according to the example of Table 9 may also be referred to as an effective number of interrupted slots.

According to the example of Table 9, cases in which interruption is not substantially applied in an NR slot (e.g., "PSCCH/PSSCH slot without PSFCH") (e.g., cases in which the number of interrupted NR slots is 0 in the example of Table 9) are also present. This means that NR SL scheduling may be protected without loss. Therefore, the number of interrupted NR slots according to the example of Table 9 may be considered in order for a UE to perform effective V2X communication.

According to details summarized in the example of Table 9, the following may be applied to V2X communication. When a UE performs switching from NR SL to LTE SL, interruption may be applied to 1 slot or 0 slots according to the number of symbols configured in an NR slot (e.g., a slot in which PSCCH/PSSCH slot without PSFCH is configured) (e.g., the number of PSSCH symbols configured in the NR slot) and the SCS of NR SL. The UE may not expect transmission and/or reception of an NR SL signal for the slot to which the interruption is applied.

Alternatively, the number of slots to which interruption is applied may be suggested as follows with reference to the details summarized in the example of Table 9.

1) When SCS is 15 kHz
 1-1) Zero slot interruption (no interruption) for $l_d \leq 9+\Delta$
 1-2) One slot interruption for $l_d > 9+\Delta$
2) When SCS is 30 kHz
 2-1) Zero slot interruption (no interruption) for $l_d \leq 8+\Delta$
 2-2) One slot interruption for $l_d > 8+\Delta$
3) When SCS is 60 kHz
 one slot interruption Here, $\Delta = \pm 2$. For example, $\Delta$ may be +2, +1, 0, −1 or −2.

When a UE performs switching from NR SL to LTE SL, the following may be applied to an NR slot (e.g., PSCCH/PSSCH slot with PSFCH). Here, the NR slot may include a PSFCH. The PSFCH is always located in the 12th symbol (symbol number=ii) and 13rd symbol (symbol number=12) in the NR slot. Therefore, in all cases in which the SCS is 15 kHz, 30 kHz, and 60 kHz, interruption occurs for the PSFCH symbol. In other words, in the NR PSCCH/PSSCH slot with PSFCH, for all SCSs (15 kHz, 30 kHz, and 60 kHz), interruption may always be applied to the PSFCH symbol when the UE performs switching from NR SL to LTE SL. For PSSCHs other than the PSFCH, the same situations as those described in FIGS. 16 to 18 and Tables 8 to 9 are applied. However, since the UE processes NR signals in units of slots, interruption may always occur in one NR slot for a PSCCH/PSSCH slot with PSFCH. This is because interruption always occurs for the PSFCH symbol and the UE processes NR signals in units of slots, and thus if interruption occurs even for one PSFCH symbol, the UE recognizes that interruption has occurred for the entire slot. Therefore, when the UE performs switching from NR SL to LTE SL in the PSCCH/PSSCH slot with PSFCH, it is assumed that interruption is applied to one slot. The UE may not expect transmission and/or reception of an NR SL signal for the slot to which interruption is applied.

When the UE performs switching from NR SL to LTE SL, the following may be applied to an NR slot (e.g., PSPSS/PSSSS/PSBCH slot). For all cases in which the SCS is 15 kHz, 30 kHz, and 60 kHz, interruption occurs in one slot (PSPSS/PSSSS/PSBCH slot). This is because, in the PSPSS/PSSSS/PSBCH slot, 13 symbols can be configured in such a manner that symbol numbers of "0.5 to 12" are assigned to a PSBCH, symbol numbers of "1 and 2" are assigned to a PSPSS, and symbol numbers of "3 and 4" are assigned to a PSSSS. In other words, when the UE performs switching from NR SL to LTE SL in the PSPSS/PSSSS/PSBCH slot, for all SCSs (15 kHz, 30 kHz, and 60 kHz), interruption can always be applied to one slot (PSPSS/PSSSS/PSBCH slot). The UE may not expect transmission and/or reception of an NR SL signal for the slot to which interruption is applied.

When the UE performs switching from LTE SL to NR SL in an NR slot, the following may be applied to the NR slot. When the UE performs switching from LTE SL to NR SL in the NR slot, interruption occurs in one slot regardless of NR physical channel type. This is because an RF switching time is applied at the start point of the NR slot, and symbols related to the physical channel of the NR slot are allocated from the start point of the NR slot. In other words, when the UE performs switching from LTE SL to NR SL in the NR slot, interruption may always be applied to one slot (NR slot). The UE may not expect transmission and/or reception of an NR SL signal for the slot to which interruption is applied.

When the UE performs switching from NR SL to LTE SL in an LTE subframe, the following may be applied to the LTE subframe. When the UE performs switching from NR SL to LTE SL, interruption occurs in one subframe. This is because the UE processes LTE V2X signals in units of subframes, and an RF switching time is applied from the start point of the LTE subframe. In other words, when the UE performs switching from NR SL to LTE SL in the LTE subframe, interruption may always be applied to one LTE subframe. The UE may not expect the transmission and/or reception of an LTE SL signal for the subframe to which interruption is applied.

When the UE performs switching from LTE SL to NR SL in an LTE subframe, the following may be applied to the LTE subframe. When the UE performs switching from LTE SL to NR SL, interruption occurs in one subframe. This is because the UE processes LTE V2X signals in units of subframes, and an RF switching time is applied from the last point of the LTE subframe. In other words, when the UE performs switching from LTE SL to NR SL in the LTE subframe, interruption may always be applied to one LTE subframe. The UE may not expect the transmission and/or reception of an LTE SL signal for the subframe to which interruption is applied.

Hereinafter, an example of UE operations based on the present disclosure, the first example and the second example of the present disclosure, and description with reference to various drawings and tables will be described.

The following drawings were created to explain a specific example of the present disclosure. Since the names of specific devices described in the drawings or the names of specific signals/messages/fields are presented by way of example, the technical features of the present disclosure are not limited to the specific names used in the following drawings.

Figure 19:
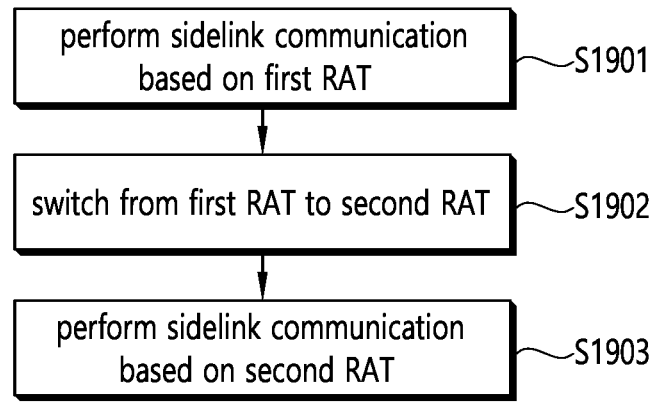
FIG. 19 shows an example of an operation of a UE according to the present disclosure.

FIG. 19 shows an example of a UE operation according to the present disclosure.

For reference, the UE operation illustrated in FIG. 19 is merely an example, and a UE can perform operations according to the present disclosure described through the above-described various examples even if the operations are not illustrated in FIG. 19.

In step S1901, a UE may perform sidelink communication based on a first RAT. Here, sidelink (SL) communication may be used in the same meaning as V2X communication and V2X sidelink (SL) communication. The first RAT may be either NR or E-UTRA. Here, E-UTRA and LTE may be used in the same meaning.

In step S1902, the UE may switch the first RAT to a second RAT. For example, the UE may switch RAT for sidelink communication from the first RAT to the second RAT. Here, when the first RAT is NR, the second RAT may be E-UTRA. Conversely, when the first RAT is E-UTRA, the second RAT may be NR. Switching may be performed in an NR slot or an E-UTRA subframe located before or after the boundary between a time at which the first RAT communication is performed and a time at which the second RAT communication is performed.

In step S1903, the UE may perform sidelink communication based on the second RAT. When switching is performed in an NR slot, 1-slot interruption may be applied to the corresponding NR slot. When switching is performed in an E-UTRA subframe, 1-subframe interruption may be applied to the corresponding E-UTRA subframe. In other words, when switching is performed in an NR slot, the UE may not expect transmission or reception of an NR sidelink signal in the corresponding NR slot. When switching is performed in an E-UTRA subframe, the UE may not expect transmission or reception of an E-UTRA sidelink signal in the corresponding E-UTRA subframe.

For example, when switching from E-UTRA to NR is performed, the last E-UTRA subframe may be defined as E-UTRA subframe n−1 (where n is an arbitrary positive integer), and the first NR slot may be defined as NR slot n. As an example, when switching is performed in E-UTRA subframe n−1, the UE may not expect transmission or reception of an E-UTRA sidelink signal in the corresponding E-UTRA subframe n−1. As another example, when switching is performed in NR slot n, the UE may not expect transmission or reception of an NR sidelink signal in the corresponding NR slot n.

As another example, when switching from NR to E-UTRA is performed, the last NR slot may be defined as NR slot n−1 (where n is an arbitrary positive integer), and the first E-UTRA subframe may be defined as UTRA subframe n. As an example, when switching is performed in E-UTRA subframe n, the UE may not expect transmission or reception of an E-UTRA sidelink signal in the corresponding E-UTRA subframe n. As another example, when switching is performed in NR slot n−1, the UE may not expect transmission or reception of an NR sidelink signal in the corresponding NR slot n−1.

For reference, "switching between LTE SL (or V2X) and NR SL (V2X)" described in the present disclosure may occur in a scenario such as the following example. That is, the UE may perform switching between LTE SL (or V2X) and NR SL (V2X) in a scenario such as the following example.

For example, the UE may inform a network (e.g., a base station) that the UE supports LTE SL and NR SL in the same band. For example, as in the example of FIG. 9, the UE may perform an operation of transmitting capability information to the base station.

The network may receive information representing that the UE supports LTE SL and NR SL in the same band from the UE. Then, the network may configure resource pools in consideration of all of neighboring LTE SL UEs, neighboring NR SL UEs, and neighboring LTE SL+NR SL UEs (UEs supporting both LTE SL and NR SL). Here, a "neighboring" UE is a UE supporting SL communication and may mean a UE that is located around a network and can receive scheduling information from the network (e.g., a base station). For example, an LTE SL TX resource pool, an LTE SL RX resource pool, an NR SL TX resource pool, an NR SL RX resource pool may be configured. In addition, the network may transmit LTE SL TX resource pool information, LTE SL RX resource pool information, NR SL TX resource pool information, and NR SL RX resource pool information to the UE.

The UE may receive the LTE SL TX resource pool information, the LTE SL RX resource pool information, the NR SL TX resource pool information, and the NR SL RX resource pool information. Based on the received resource pool information, the UE may determine a time at which an LTE SL signal will be transmitted (e.g., LTE SL TX time) and a time at which an NR SL signal will be transmitted (e.g., NR SL TX time).

When the UE transmits an NR SL signal while transmitting an LTE SL signal, or transmitting an LTE SL signal while transmitting an NR SL signal, the UE may perform RF switching. For example, immediately after transmitting the LTE SL signal using the LTE SL TX resource pool, the UE may transmit the NR SL signal in an NR slot using the NR SL TX resource pool. In this case, the UE requires RF switching in order to transmit the NR SL signal after transmitting the LTE SL signal. On the other hand, immediately after transmitting the NR SL signal using the NR SL TX resource pool, the UE may transmit the LTE SL signal in an LTE subframe using the LTE SL TX resource pool. In this case, the UE requires RF switching in order to transmit the LTE SL signal after transmitting the NR SL signal.

In this way, the UE performs RF switching in order to perform LTE SL communication and NR SL communication using the LTE SL TX resource pool and NR SL TX resource pool information.

If there is no network (e.g., when information related to resource pools is not received from the network), the UE may perform RF switching in order to perform LTE SL communication and NR SL communication using information on a pre-configured LTE SL Tx resource pool and a pre-configured NR SL Tx resource pool.

According to description of the present disclosure, a UE can efficiently perform sidelink (or V2X) communication. For example, the UE can efficiently perform switching between NR V2X SL and E-UTRA V2X SL. For example, when the UE performs switching between NR V2X SL and E-UTRA V2X SL, interruption is applied in one NR slot or one E-UTRA subframe, and thus the UE may not expect transmission or reception of a sidelink signal in one NR slot or one E-UTRA subframe.

For reference, the operation of the UE described in the present disclosure may be implemented by the devices of FIGS. 1 to 3 described above. For example, a terminal (e.g., UE) may be the first device 100 or the second device 200 of FIG. 1. For example, the operation of a terminal (e.g., UE) described in the present disclosure may be processed by one or more processors 102 or 202. The operation of the terminal described in the present disclosure may be stored in one or more memories 104 or 204 in the form of an instruction/program (e.g., instruction and executable code) executable by the one or more processors 102 or 202. The one or more processors 102 or 202 may control the one or more memories 104 or 204 and one or more transceivers 105 or 206 and execute instructions/programs stored in the one or more memories 104 or 204 to perform the operation of a terminal (e.g., UE) described in the present disclosure.

In addition, instructions for performing the operation of a terminal (e.g., UE) described in the present disclosure may be stored in a non-volatile computer-readable storage medium. The storage medium may be included in the one or more memories 104 or 204. In addition, the instructions recorded in the storage medium may be executed by the one or more processors 102 or 202 to perform the operation of a terminal (e.g., UE) described in the present disclosure.

For reference, the operations of a base station (e.g., NG-RAN, gNB, gNB (NB-IoT), gNB (NR) eNB, RAN, etc.) described in the present disclosure may be implemented by the devices of FIGS. 1 to 3 which will be described below. For example, the base station (e.g., NG-RAN, gNB, gNB (NB-IoT), gNB (NR) eNB, RAN, etc.) may be the first device 100a or the second device 100b of FIG. 1. For example, the operation of the base station (e.g., NG-RAN, gNB, gNB (NB-IoT), gNB (NR) eNB, RAN, etc.) described in the present disclosure may be processed by one or more processors 102 or 202. The operation of the terminal described in the present disclosure may be stored in one or more memories 104 or 204 in the form of an instruction/program (e.g., instruction and executable code) executable by the one or more processors 102 or 202. The one or more processors 102 or 202 may control the one or more memories 104 or 204 and one or more transceivers 106 or 206 and execute instructions/programs stored in the one or more memories 104 or 204 to perform the operation of the base station (e.g., NG-RAN, gNB, gNB (NB-IoT), gNB (NR) eNB, RAN, etc.) described in the present disclosure.

In addition, the instructions for performing the operation of the base station (e.g., NG-RAN, gNB, gNB (NB-IoT), gNB (NR) eNB, RAN, etc.) described in the present disclosure may be stored in a non-volatile (or non-transitory) computer-readable storage medium. The storage medium may be included in the one or more memories 104 or 204. In addition, the instructions recorded in the storage medium may be executed by the one or more processors 102 or 202 to perform the operation of the base station (e.g., NG-RAN, gNB, gNB (NB-IoT), gNB (NR) eNB), RAN, etc.) described in the present disclosure.

Although preferred embodiments have been described above, the present disclosure is not limited to such specific embodiments and thus can be modified, changed, or improved in various manners within the spirt of the present disclosure and the scope of the claims.

Although methods are described as a series of steps or blocks based on a flowchart in the exemplary system described above, they are not limited to the order of the described steps, and some steps may occur in a different order or simultaneously with other steps as described above. In addition, those skilled in the art will understand that the steps shown in the flowchart are not exclusive, and that other steps may be included or that one or more steps of a flowchart may be deleted without affecting the scope of rights.

The claims described herein may be combined in various ways. For example, the technical features of the method claims of the present disclosure may be combined and implemented as an apparatus, and the technical features of the apparatus claims of the present disclosure may be combined and implemented as a method. In addition, the technical features of the method claims of the present disclosure and the technical features of the apparatus claims may be combined and implemented as an apparatus, and the technical features of the method claims of the present disclosure and the technical features of the apparatus claims may be combined and implemented as a method.

What is claimed is:

1. A method for performing sidelink transmission by a user equipment (UE), the method comprising:
   performing a sidelink transmission with one or more other UEs based on a first Vehicle to Everything (V2X) Sidelink (SL) technology,
   wherein the first V2X SL technology is one among Evolved Universal terrestrial Radio Access (E-UTRA) V2X SL and New Radio (NR) V2X SL;
   switching, for the sidelink transmission with the one or more other UEs, from the first V2X SL technology to a second V2X SL technology,
   wherein the second V2X SL technology is one other than the first V2X SL technology among the E-UTRA V2X SL and the NR V2X SL; and
   performing the sidelink transmission with one or more other UEs based on the second V2X SL technology,
   wherein regardless of a switching direction from the first V2X SL technology to the second V2X SL technology and a switching direction from the second V2X SL technology to the first V2X SL technology, a sidelink signal is not expected to be received or to be transmitted on the E-UTRA subframe, which is a single subframe, based on an interruption occurring in the E-UTRA subframe due to the switching being performed on the E-UTRA subframe, and
   wherein regardless of the switching direction from the first V2X SL technology to the second V2X SL technology and from the second V2X SL technology to the first V2X SL technology, a sidelink signal is not expected to be received or to be transmitted on the NR slot, which is a single slot, based on an interruption occurring in the NR slot due to the switching being performed on the NR slot.

2. The method of claim 1,
   wherein the first V2X SL technology is the NR V2X SL, the second V2X SL technology is the E-UTRA V2X SL,
   wherein transmission or reception of the sidelink signal in the NR slot is not expected when the switching is performed in the NR slot, and
   wherein transmission or reception of the sidelink signal in the E-UTRA subframe is not expected when the switching is performed in the E-UTRA subframe.

3. The method of claim 1,
   wherein the first V2X SL technology is the E-UTRA V2X SL, the second V2X SL technology is the NR V2X SL,
   wherein transmission or reception of the sidelink signal in the NR slot is not expected when the switching is performed in the NR slot, and
   wherein transmission or reception of the sidelink signal in the E-UTRA subframe is not expected when the switching is performed in the E-UTRA subframe.

4. The method of claim 1, further comprising:
   transmitting capability information indicating that the UE supports sidelink transmission with one or more of other UEs based on the E-UTRA V2X SL and sidelink transmission with one or more of other UEs based on the NR V2X SL to a base station.

5. The method of claim 1, further comprising:
   receiving packet priority information for the E-UTRA V2X SL and packet priority information for the NR V2X SL.

6. The method of claim 5, wherein the switching is performed in a subframe or a slot of a V2X SL technology having a lower priority between the E UTRA V2X SL and the NR V2X SL based on the packet priority information of the E-UTRA V2X SL and the packet priority information of the NR V2X SL.

7. User equipment (UE) performing sidelink transmission, comprising:
   at least one processor; and
   at least one memory configured to store instructions and operably electrically connectable to the at least one processor,
   wherein operations performed based on the instructions being executed by the at least one processor comprise:
   performing a sidelink transmission with one or more other UEs based on a first Vehicle to Everything (V2X) Sidelink (SL) technology,
   wherein the first V2X SL technology is one among Evolved Universal terrestrial Radio Access (E-UTRA) V2X SL and New Radio (NR) V2X SL;
   switching, for the sidelink transmission with the one or more other UEs, from the first V2X SL technology to a second V2X SL technology,
   wherein the second V2X SL technology is one other than the first V2X SL technology among the E-UTRA V2X SL and the NR V2X SL; and
   performing the sidelink transmission with the one or more other UEs based on the second V2X SL technology,
   wherein regardless of a switching direction from the first V2X SL technology to the second V2X SL technology and a switching direction from the second V2X SL technology to the first V2X SL technology, a sidelink signal is not expected to be received or to be transmitted on the E-UTRA subframe, which is a single subframe, based on an interruption occurring in the E-UTRA subframe due to the switching being performed on the E-UTRA subframe, and
   wherein regardless of the switching direction from the first V2X SL technology to the second V2X SL technology and from the second V2X SL technology to the first V2X SL technology, a sidelink signal is not expected to be received or to be transmitted on the NR slot, which is a single slot, based on an interruption occurring in the NR slot due to the switching being performed on the NR slot.

8. The UE of claim 7,
   wherein the first V2X SL technology is the NR V2X SL, the second V2X SL technology is the E-UTRA V2X SL,
   wherein transmission or reception of the sidelink signal in the NR slot is not expected when the switching is performed in the NR slot, and
   wherein transmission or reception of the sidelink signal in the E-UTRA subframe is not expected when the switching is performed in the E-UTRA subframe.

9. The UE of claim 7,
   wherein the first V2X SL technology is the E-UTRA V2X SL, the second V2X SL technology is the NR V2X SL,
   wherein transmission or reception of the sidelink signal in the NR slot is not expected when the switching is performed in the NR slot, and
   wherein transmission or reception of the sidelink signal in the E-UTRA subframe is not expected when the switching is performed in the E-UTRA subframe.

10. The UE of claim 7, wherein the operations further comprise:

transmitting capability information indicating that the UE supports sidelink transmission with one or more of other UEs based on the E-UTRA V2X SL and sidelink transmission with one or more of other UEs based on the NR V2X SL to a base station.

11. The UE of claim 7, wherein the operations performed based on the instructions being executed by the at least one processor further comprise:
receiving packet priority information for the E-UTRA V2X SL and packet priority information for the NR V2X SL.

12. The UE of claim 11, wherein the switching is performed in a subframe or a slot for a V2X SL technology having a lower priority between the E-UTRA V2X SL and the NR V2X SL based on the packet priority information of the E-UTRA V2X SL and the packet priority information of the NR V2X SL.

13. The UE of claim 7, wherein the UE is an autonomous driving device communicating with at least one of a mobile terminal, a network, and an autonomous vehicle other than the UE.

14. An apparatus in mobile communication, comprising:
at least one processor; and
at least one memory configured to store instructions and operably electrically connectable to the at least one processor,
wherein operations performed based on the instructions being executed by the at least one processor comprise:
generating a signal for sidelink transmission with one or more other UEs based on a first Vehicle to Everything (V2X) Sidelink (SL) technology,
wherein the first V2X SL technology is one among Evolved Universal terrestrial Radio Access (E-UTRA) V2X SL and New Radio (NR) V2X SL;
switching, for the sidelink transmission with the one or more other UEs, from the first V2X SL technology to a second V2X SL technology,
wherein the second V2X SL technology is one other than the first V2X SL technology among the E-UTRA V2X SL and the NR V2X SL; and
generating a signal for the sidelink transmission with the one or more other UEs based on the second V2X SL technology,
wherein regardless of a switching direction from the first V2X SL technology to the second V2X SL technology and a switching direction from the second V2X SL technology to the first V2X SL technology, a sidelink signal is not expected to be received or to be transmitted on the E-UTRA subframe, which is a single subframe, based on an interruption occurring in the E-UTRA subframe due to the switching being performed on the E-UTRA subframe, and
wherein regardless of the switching direction from the first V2X SL technology to the second V2X SL technology and from the second V2X SL technology to the first V2X SL technology, a sidelink signal is not expected to be received or to be transmitted on the NR slot, which is a single slot, based on an interruption occurring in the NR slot due to the switching being performed on the NR slot.

* * * * *